United States Patent
Cox

(10) Patent No.: US 12,528,279 B2
(45) Date of Patent: Jan. 20, 2026

(54) CORE LAYER FOR INFORMATION CARRYING CARD, RESULTING INFORMATION CARRYING CARD, AND METHODS OF MAKING THE SAME

(71) Applicant: X-Card Holdings, LLC, West Chester, PA (US)

(72) Inventor: Mark A. Cox, West Chester, PA (US)

(73) Assignee: X-CARD HOLDINGS, LLC, West Chester, PA (US)

( * ) Notice: Subject to any disclaimer, the term of this patent is extended or adjusted under 35 U.S.C. 154(b) by 694 days.

(21) Appl. No.: 17/970,032

(22) Filed: Oct. 20, 2022

(65) Prior Publication Data

US 2024/0131833 A1 Apr. 25, 2024
US 2024/0227379 A9 Jul. 11, 2024

(51) Int. Cl.
*B32B 37/24* (2006.01)
*B32B 3/08* (2006.01)
(Continued)

(52) U.S. Cl.
CPC ............... *B32B 37/24* (2013.01); *B32B 3/08* (2013.01); *B32B 3/266* (2013.01); *B32B 3/30* (2013.01);
(Continued)

(58) Field of Classification Search
None
See application file for complete search history.

(56) References Cited

U.S. PATENT DOCUMENTS 2,890,202 A 6/1959 Parker
3,024,216 A 3/1962 Smitmans et al.
(Continued)

FOREIGN PATENT DOCUMENTS

CN 1132375 A 10/1996
CN 1214780 A 4/1999
(Continued)

OTHER PUBLICATIONS

"Material Safety Data Sheet for Rigid PVC (Vinyl) Films," Klöckner Pentaplast of America, Inc., Rev. Mar. 2010.
(Continued)

*Primary Examiner* — Michael N Orlando
*Assistant Examiner* — Abhishek A Patwardhan
(74) *Attorney, Agent, or Firm* — DUANE MORRIS LLP

(57) ABSTRACT

The disclosure provides a method for forming a core layer for a plurality of information carrying cards, a resulting core layer, and a resulting information carrying card. A first portion of a crosslinkable polymer composition is dispensed onto the first thermoplastic layer. A second thermoplastic layer having a plurality of through-holes therein is then applied. A second portion of the crosslinkable polymer composition is dispensed into each through-hole. An inlay layer is placed over the polymer composition inside each through-hole. A third portion of the crosslinkable polymer composition is dispensed over each inlay layer. A third thermoplastic layer or a release film is placed over the third portion of the crosslinkable polymer composition to provide a layered structure. Each respective inlay layer is configured to be movable and/or self-center inside each through-hole in the presence of the crosslinkable polymer composition when the layered structure is pressed on a pressure.

19 Claims, 20 Drawing Sheets

(51) Int. Cl.

| | | |
|---|---|---|
| *B32B 3/26* | (2006.01) | |
| *B32B 3/30* | (2006.01) | |
| *B32B 25/08* | (2006.01) | |
| *B32B 25/20* | (2006.01) | |
| *B32B 27/08* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/38* | (2006.01) | |
| *B32B 27/40* | (2006.01) | |
| *B32B 37/10* | (2006.01) | |
| *B32B 38/00* | (2006.01) | |
| *B32B 38/10* | (2006.01) | |

(52) U.S. Cl.
CPC ............ *B32B 27/08* (2013.01); *B32B 27/304* (2013.01); *B32B 27/38* (2013.01); *B32B 37/10* (2013.01); *B32B 38/0004* (2013.01); *B32B 38/10* (2013.01); *B32B 25/08* (2013.01); *B32B 25/20* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 2250/24* (2013.01); *B32B 2305/026* (2013.01); *B32B 2305/34* (2013.01); *B32B 2305/72* (2013.01); *B32B 2307/412* (2013.01); *B32B 2307/748* (2013.01); *B32B 2307/75* (2013.01); *B32B 2309/105* (2013.01); *B32B 2398/20* (2013.01); *B32B 2425/00* (2013.01); *B32B 2457/08* (2013.01); *B32B 2457/10* (2013.01); *B32B 2457/20* (2013.01)

(56) References Cited

U.S. PATENT DOCUMENTS

| | | |
|---|---|---|
| 3,790,801 A | 2/1974 | Coleman |
| 3,819,929 A | 6/1974 | Newman |
| 3,836,414 A | 9/1974 | Staats |
| 3,847,654 A | 11/1974 | Althouse |
| 4,115,479 A | 9/1978 | Daidone |
| 4,117,036 A | 9/1978 | Honda et al. |
| 4,310,451 A | 1/1982 | Ernest et al. |
| 4,322,170 A | 3/1982 | Papenmeier |
| 4,382,201 A | 5/1983 | Trzaskos |
| 4,399,061 A | 8/1983 | Sickert |
| 4,463,128 A | 7/1984 | Lin |
| 4,480,079 A | 10/1984 | Orton et al. |
| 4,592,976 A | 6/1986 | Whitehead |
| 4,627,642 A | 12/1986 | Peronneau et al. |
| 4,640,636 A | 2/1987 | Hofmann |
| 4,742,085 A | 5/1988 | Cozens |
| 4,743,636 A | 5/1988 | Bersano |
| 4,754,319 A | 6/1988 | Saito et al. |
| 4,769,278 A | 9/1988 | Kamimura et al. |
| 4,775,698 A | 10/1988 | Cozens |
| 4,775,699 A | 10/1988 | Cozens |
| 4,775,700 A | 10/1988 | Cozens |
| 4,775,701 A | 10/1988 | Cozens |
| 4,775,702 A | 10/1988 | Cozens |
| 4,792,843 A | 12/1988 | Haghiri-Tehrani et al. |
| 4,801,418 A | 1/1989 | Bersano |
| 4,822,989 A | 4/1989 | Miyamoto |
| 4,843,225 A | 6/1989 | Hoppe |
| 4,876,441 A | 10/1989 | Hara et al. |
| 4,907,061 A | 3/1990 | Kohara |
| 4,929,171 A | 5/1990 | Hayashi |
| 4,954,195 A | 9/1990 | Turpin |
| 5,013,900 A | 5/1991 | Hoppe |
| 5,057,265 A | 10/1991 | Kunert et al. |
| 5,084,501 A | 1/1992 | Drout et al. |
| 5,126,396 A | 6/1992 | Orton et al. |
| 5,143,723 A | 9/1992 | Calvo et al. |
| 5,169,571 A | 12/1992 | Buckley |
| 5,198,170 A | 3/1993 | Hawrylko |
| 5,198,501 A | 3/1993 | Bott et al. |
| 5,204,405 A | 4/1993 | Orikasa et al. |
| 5,233,022 A | 8/1993 | Donatti et al. |
| 5,255,430 A | 10/1993 | Tallaksen |
| 5,276,106 A | 1/1994 | Portelli et al. |
| 5,286,437 A | 2/1994 | Severiens |
| 5,298,542 A | 3/1994 | Nakamura |
| 5,319,028 A | 6/1994 | Nakamura |
| 5,324,506 A | 6/1994 | Calvo et al. |
| 5,407,617 A | 4/1995 | Oppermann et al. |
| 5,407,893 A | 4/1995 | Koshizuka et al. |
| 5,462,996 A | 10/1995 | Portelli et al. |
| 5,520,863 A | 5/1996 | Ochi et al. |
| 5,599,765 A | 2/1997 | Ohshima et al. |
| 5,604,266 A | 2/1997 | Mushovic |
| 5,608,203 A | 3/1997 | Finkelstein et al. |
| 5,626,958 A | 5/1997 | D'Herbecourt et al. |
| 5,672,646 A | 9/1997 | Allas et al. |
| 5,690,773 A | 11/1997 | Fidalgo et al. |
| 5,740,314 A | 4/1998 | Grimm |
| 5,741,392 A | 4/1998 | Droz |
| 5,767,503 A | 6/1998 | Gloton |
| 5,784,782 A | 7/1998 | Boyko et al. |
| 5,822,194 A | 10/1998 | Horiba et al. |
| 5,852,289 A | 12/1998 | Masahiko |
| 5,955,021 A | 9/1999 | Tiffany, III |
| 5,955,198 A | 9/1999 | Hashimoto et al. |
| 5,972,514 A | 10/1999 | D'Herbecourt et al. |
| 5,975,420 A | 11/1999 | Gogami et al. |
| 6,025,054 A | 2/2000 | Tiffany, III |
| 6,037,879 A | 3/2000 | Tuttle |
| 6,052,062 A | 4/2000 | Tuttle |
| 6,100,804 A | 8/2000 | Brady et al. |
| 6,160,526 A | 12/2000 | Hirai et al. |
| 6,217,685 B1 | 4/2001 | Leydier et al. |
| 6,256,873 B1 | 7/2001 | Tiffany, III |
| 6,293,470 B1 | 9/2001 | Asplund |
| 6,305,609 B1 | 10/2001 | Melzer et al. |
| 6,330,464 B1 | 12/2001 | Colvin, Jr. et al. |
| 6,376,769 B1 | 4/2002 | Chung |
| 6,380,272 B1 | 4/2002 | Chen |
| 6,380,845 B2 | 4/2002 | Tuttle |
| 6,404,643 B1 | 6/2002 | Chung |
| 6,406,757 B1 | 6/2002 | Blatter et al. |
| 6,423,760 B1 | 7/2002 | Qiao et al. |
| 6,441,085 B1 | 8/2002 | Saethre et al. |
| 6,446,874 B1 | 9/2002 | Elbaz et al. |
| 6,462,273 B1 | 10/2002 | Corisis et al. |
| 6,468,835 B1 | 10/2002 | Blanc et al. |
| 6,477,926 B1 | 11/2002 | Swisher et al. |
| 6,495,127 B1 | 12/2002 | Wallace et al. |
| 6,521,985 B1 | 2/2003 | Dossetto |
| 6,534,588 B1 | 3/2003 | Löcken et al. |
| 6,551,537 B2 | 4/2003 | Chen |
| 6,599,993 B1 | 7/2003 | Norris |
| 6,607,135 B1 | 8/2003 | Hirai et al. |
| 6,611,050 B1 | 8/2003 | Ference et al. |
| 6,624,212 B2 | 9/2003 | Weier et al. |
| 6,639,309 B2 | 10/2003 | Wallace |
| 6,649,688 B1 | 11/2003 | Mayer et al. |
| 6,653,394 B1 | 11/2003 | Meisenburg et al. |
| 6,673,423 B2 | 1/2004 | Kranenburg-Van Dijk et al. |
| 6,689,727 B1 | 2/2004 | Olsson |
| 6,693,513 B2 | 2/2004 | Tuttle |
| 6,730,734 B1 | 5/2004 | Hamilton et al. |
| 6,765,289 B2 | 7/2004 | Nakata et al. |
| 6,768,415 B1 | 7/2004 | Tuttle |
| 6,772,953 B2 | 8/2004 | Iiyama et al. |
| 6,780,897 B1 | 8/2004 | Blum et al. |
| 6,784,230 B1 | 8/2004 | Patterson et al. |
| 6,786,415 B2 | 9/2004 | Yiu |
| 6,786,748 B2 | 9/2004 | Masson et al. |
| 6,790,893 B2 | 9/2004 | Nguyen et al. |
| 6,861,475 B2 | 3/2005 | Ilenda et al. |

(56) References Cited

U.S. PATENT DOCUMENTS

| | | |
|---|---|---|
| 6,884,837 B2 | 4/2005 | Kohlhammer et al. |
| 6,902,116 B2 | 6/2005 | Finkelstein |
| 6,908,786 B2 | 6/2005 | Halope |
| 6,918,984 B2 | 7/2005 | Murray et al. |
| 6,943,437 B2 | 9/2005 | Blanc et al. |
| 6,960,620 B2 | 11/2005 | Wenning et al. |
| 6,984,205 B2 | 1/2006 | Gazdzinski |
| 6,989,349 B2 | 1/2006 | Tatewaki et al. |
| 7,012,504 B2 | 3/2006 | Tuttle |
| 7,030,179 B2 | 4/2006 | Patterson et al. |
| 7,137,148 B2 | 11/2006 | Tao et al. |
| 7,147,625 B2 | 12/2006 | Sarangapani et al. |
| 7,217,747 B2 | 5/2007 | Weier et al. |
| 7,221,257 B1 | 5/2007 | Tuttle |
| 7,237,724 B2 | 7/2007 | Singleton |
| 7,377,446 B2 | 5/2008 | Ohta et al. |
| 7,382,045 B2 | 6/2008 | Osako et al. |
| 7,433,655 B2 | 10/2008 | Jacobs et al. |
| 7,511,371 B2 | 3/2009 | Wallace |
| 7,528,191 B2 | 5/2009 | Metzemacher et al. |
| 7,545,336 B2 | 6/2009 | Naito |
| 7,566,001 B2 | 7/2009 | Yamazaki |
| 7,592,394 B2 | 9/2009 | Yang et al. |
| 7,597,266 B2 | 10/2009 | Benato |
| 7,601,563 B2 | 10/2009 | Chen et al. |
| 7,608,306 B2 | 10/2009 | Hasskerl et al. |
| 7,668,588 B2 | 2/2010 | Kovacs |
| 7,728,734 B2 | 6/2010 | Arai et al. |
| 7,795,077 B2 | 9/2010 | Tsai et al. |
| 7,805,064 B2 | 9/2010 | Ragay et al. |
| 7,823,792 B2 | 11/2010 | Bi et al. |
| 7,868,441 B2 | 1/2011 | Eaton et al. |
| 7,877,120 B2 | 1/2011 | Jacobs et al. |
| 7,917,298 B1 | 3/2011 | Scher et al. |
| 7,939,920 B2 | 5/2011 | Wallace |
| 7,954,724 B2 | 6/2011 | Poidomani et al. |
| 7,972,031 B2 | 7/2011 | Ray et al. |
| 7,989,268 B2 | 8/2011 | Chen et al. |
| 8,012,809 B2 | 9/2011 | Reed |
| 8,017,147 B2 | 9/2011 | Mazed et al. |
| 8,034,153 B2 | 10/2011 | Marchiando et al. |
| 8,044,508 B2 | 10/2011 | Jenson et al. |
| 8,231,063 B2 | 7/2012 | Poidomani et al. |
| 8,314,408 B2 | 11/2012 | Hartsuiker et al. |
| 8,382,000 B2 | 2/2013 | Mullen et al. |
| 8,424,773 B2 | 4/2013 | Mullen et al. |
| 8,540,165 B2 | 9/2013 | Foo et al. |
| 8,551,387 B2 | 10/2013 | Feldman et al. |
| 8,608,080 B2 | 12/2013 | Finn |
| 8,673,452 B2 | 3/2014 | Petzoldt et al. |
| 8,678,276 B2 | 3/2014 | Poidomani et al. |
| 8,881,373 B1 | 11/2014 | Koepp et al. |
| 9,122,968 B2 | 9/2015 | Cox |
| 9,183,486 B2 | 11/2015 | Cox |
| 9,439,334 B2 | 9/2016 | Cox |
| 9,594,999 B2 | 3/2017 | Cox |
| 9,633,303 B2 | 4/2017 | Pueschner et al. |
| 9,688,850 B2 | 6/2017 | Cox |
| 9,792,541 B2 | 10/2017 | Launay |
| 10,040,308 B2 | 8/2018 | Droz |
| 10,127,489 B2 | 11/2018 | Cox |
| 10,255,539 B2 | 4/2019 | Cox |
| 10,339,434 B2 | 7/2019 | Cox |
| 10,385,514 B1* | 8/2019 | Jones .................. B42D 25/435 |
| 10,392,502 B2 | 8/2019 | Cox |
| 10,906,287 B2 | 2/2021 | Cox |
| 11,170,281 B2 | 11/2021 | Cox |
| 2001/0012680 A1 | 8/2001 | Cobbley et al. |
| 2001/0034399 A1 | 10/2001 | Kohlhammer et al. |
| 2001/0043141 A1 | 11/2001 | Tuttle |
| 2001/0046652 A1 | 11/2001 | Ostler et al. |
| 2002/0013387 A1 | 1/2002 | Weier et al. |
| 2002/0042452 A1 | 4/2002 | Chen |
| 2002/0055581 A1 | 5/2002 | Lorah et al. |
| 2002/0086908 A1 | 7/2002 | Chou et al. |
| 2002/0091178 A1 | 7/2002 | Amin-Javaheri |
| 2002/0119294 A1 | 8/2002 | Monkarsh et al. |
| 2002/0125431 A1 | 9/2002 | Hwang |
| 2002/0125598 A1 | 9/2002 | Chen |
| 2002/0131251 A1 | 9/2002 | Corisis et al. |
| 2002/0132086 A1 | 9/2002 | Su-Tuan |
| 2002/0140546 A1 | 10/2002 | Tuttle |
| 2002/0146549 A1 | 10/2002 | Kranenburg-Van Dijk et al. |
| 2003/0000070 A1 | 1/2003 | Lee et al. |
| 2003/0012926 A1 | 1/2003 | Murari et al. |
| 2003/0020182 A1 | 1/2003 | Blanc et al. |
| 2003/0090007 A1 | 5/2003 | Fischback et al. |
| 2003/0105188 A1 | 6/2003 | Nguyen et al. |
| 2003/0127525 A1 | 7/2003 | Stromberg |
| 2003/0153120 A1 | 8/2003 | Halope |
| 2003/0175433 A1 | 9/2003 | Wenning et al. |
| 2003/0178495 A1 | 9/2003 | Jones et al. |
| 2003/0183914 A1 | 10/2003 | Wallace |
| 2003/0216701 A1 | 11/2003 | Sumarta |
| 2003/0217517 A1 | 11/2003 | Allison et al. |
| 2004/0002559 A1 | 1/2004 | Troutman et al. |
| 2004/0012027 A1 | 1/2004 | Keller et al. |
| 2004/0023538 A1 | 2/2004 | Masson et al. |
| 2004/0036155 A1 | 2/2004 | Wallace |
| 2004/0077756 A1 | 4/2004 | Weier et al. |
| 2004/0077784 A1 | 4/2004 | Ilenda et al. |
| 2004/0083531 A1 | 5/2004 | Tao et al. |
| 2004/0145453 A1 | 7/2004 | Tuttle |
| 2004/0159709 A1 | 8/2004 | Ohta et al. |
| 2004/0169086 A1 | 9/2004 | Ohta et al. |
| 2004/0180476 A1 | 9/2004 | Kazlas et al. |
| 2004/0192794 A1 | 9/2004 | Patterson et al. |
| 2004/0216658 A1 | 11/2004 | Lin |
| 2004/0266940 A1 | 12/2004 | Issari |
| 2005/0004525 A1 | 1/2005 | Sarangapani et al. |
| 2005/0006463 A1 | 1/2005 | Stephenson |
| 2005/0008604 A1 | 1/2005 | Schultz et al. |
| 2005/0023665 A1 | 2/2005 | Ledwidge |
| 2005/0025725 A1 | 2/2005 | Schultz et al. |
| 2005/0031870 A1 | 2/2005 | Liu et al. |
| 2005/0045729 A1 | 3/2005 | Yamazaki |
| 2005/0051536 A1 | 3/2005 | Shirlin et al. |
| 2005/0063027 A1* | 3/2005 | Durst .................. G07D 7/0032 359/558 |
| 2005/0130840 A1 | 6/2005 | Tatewaki et al. |
| 2005/0182156 A1 | 8/2005 | Liu |
| 2005/0203242 A1 | 9/2005 | Nakayama et al. |
| 2005/0218551 A1 | 10/2005 | Halahmi et al. |
| 2005/0234154 A1 | 10/2005 | Halahmi |
| 2005/0247794 A1* | 11/2005 | Jones .................. B42D 25/21 235/487 |
| 2006/0010685 A1 | 1/2006 | Kobayashi et al. |
| 2006/0042827 A1 | 3/2006 | Chou et al. |
| 2006/0079612 A1 | 4/2006 | Troutman et al. |
| 2006/0097059 A1 | 5/2006 | Miyazaki |
| 2006/0100378 A1 | 5/2006 | Wu |
| 2006/0134705 A1 | 6/2006 | Sundrehagen |
| 2006/0135705 A1 | 6/2006 | Vallance et al. |
| 2006/0144952 A1 | 7/2006 | Kluge |
| 2006/0155035 A1 | 7/2006 | Metzemacher et al. |
| 2006/0168802 A1 | 8/2006 | Tuttle |
| 2006/0181478 A1 | 8/2006 | Benato |
| 2006/0226240 A1 | 10/2006 | Singleton |
| 2006/0227523 A1 | 10/2006 | Pennaz et al. |
| 2006/0273898 A1 | 12/2006 | Hagiwara |
| 2006/0292382 A1 | 12/2006 | Yamazaki et al. |
| 2007/0026204 A1* | 2/2007 | Caulley .................. B42D 25/00 428/195.1 |
| 2007/0034700 A1 | 2/2007 | Poidomani et al. |
| 2007/0087230 A1 | 4/2007 | Jenson et al. |
| 2007/0096265 A1 | 5/2007 | Wallace |
| 2007/0103983 A1 | 5/2007 | Watanabe et al. |
| 2007/0104938 A1 | 5/2007 | Lin |
| 2007/0117276 A1 | 5/2007 | Chen et al. |
| 2007/0131144 A1 | 6/2007 | Winter et al. |
| 2007/0136211 A1 | 6/2007 | Brown et al. |
| 2007/0193643 A1 | 8/2007 | Jarvenkyla |
| 2007/0208233 A1 | 9/2007 | Kovacs |
| 2007/0208262 A1 | 9/2007 | Kovacs |

(56) References Cited

U.S. PATENT DOCUMENTS

| | | |
|---|---|---|
| 2007/0235548 A1 | 10/2007 | Singleton |
| 2007/0252705 A1 | 11/2007 | Halope et al. |
| 2007/0279232 A1 | 12/2007 | Halope et al. |
| 2008/0001715 A1 | 1/2008 | Tuttle |
| 2008/0012499 A1 | 1/2008 | Ragay et al. |
| 2008/0073770 A1 | 3/2008 | Yee et al. |
| 2008/0096326 A1 | 4/2008 | Reed |
| 2008/0136160 A1* | 6/2008 | Leenders ............ B42D 25/373 |
| | | 283/72 |
| 2008/0150817 A1 | 6/2008 | Carre et al. |
| 2008/0174438 A1 | 7/2008 | Tuttle |
| 2008/0194736 A1 | 8/2008 | Lu |
| 2008/0207837 A1 | 8/2008 | Weiss et al. |
| 2008/0249209 A1 | 10/2008 | Trummer et al. |
| 2008/0251906 A1 | 10/2008 | Eaton et al. |
| 2008/0262154 A1 | 10/2008 | Behrens et al. |
| 2008/0273299 A1 | 11/2008 | Tsai et al. |
| 2008/0282540 A1 | 11/2008 | Singleton |
| 2008/0299860 A1 | 12/2008 | Lee et al. |
| 2008/0308641 A1 | 12/2008 | Finn |
| 2008/0315382 A1 | 12/2008 | Wallace |
| 2009/0017195 A1 | 1/2009 | Vallance et al. |
| 2009/0018248 A1 | 1/2009 | Pirri et al. |
| 2009/0020615 A1 | 1/2009 | Patel |
| 2009/0056591 A1 | 3/2009 | Schmidt et al. |
| 2009/0068556 A1 | 3/2009 | Jacobs et al. |
| 2009/0104367 A1 | 4/2009 | Simon |
| 2009/0127344 A1 | 5/2009 | Dostmann et al. |
| 2009/0128340 A1 | 5/2009 | Masin |
| 2009/0130355 A1 | 5/2009 | Chen et al. |
| 2009/0131546 A1 | 5/2009 | Vazquez |
| 2009/0142981 A1 | 6/2009 | Arendt et al. |
| 2009/0168398 A1 | 7/2009 | Collier |
| 2009/0247369 A1 | 10/2009 | Chang |
| 2009/0252772 A1 | 10/2009 | Henglein et al. |
| 2009/0277663 A1 | 11/2009 | Valenta et al. |
| 2009/0283313 A1 | 11/2009 | Chen et al. |
| 2009/0315320 A1 | 12/2009 | Finn |
| 2010/0012680 A1 | 1/2010 | Canfield et al. |
| 2010/0015408 A1 | 1/2010 | Fong et al. |
| 2010/0039594 A1 | 2/2010 | Golan et al. |
| 2010/0048831 A1 | 2/2010 | Janowicz et al. |
| 2010/0066072 A1 | 3/2010 | Paeschke et al. |
| 2010/0075104 A1 | 3/2010 | Dehennau et al. |
| 2010/0085718 A1 | 4/2010 | Sakurai et al. |
| 2010/0096166 A1 | 4/2010 | Fjelstad |
| 2010/0105273 A1 | 4/2010 | Motomura et al. |
| 2010/0144931 A1 | 6/2010 | Balduf |
| 2010/0179273 A1 | 7/2010 | Spyrou et al. |
| 2010/0226107 A1 | 9/2010 | Rietzler |
| 2010/0249325 A1 | 9/2010 | Bothe et al. |
| 2010/0270373 A1 | 10/2010 | Poidomani et al. |
| 2010/0276919 A1 | 11/2010 | Dietemann |
| 2010/0295290 A1* | 11/2010 | Muth ................ B42D 25/36 |
| | | 428/29 |
| 2010/0298469 A1 | 11/2010 | Kaupp et al. |
| 2010/0304118 A1 | 12/2010 | Baidak et al. |
| 2010/0321913 A1 | 12/2010 | Tsai et al. |
| 2011/0011939 A1 | 1/2011 | Seah |
| 2011/0097609 A1 | 4/2011 | Jenson et al. |
| 2011/0101109 A1 | 5/2011 | Bona et al. |
| 2011/0127689 A1 | 6/2011 | Kim et al. |
| 2011/0140744 A1 | 6/2011 | Kazlas et al. |
| 2011/0140841 A1 | 6/2011 | Bona et al. |
| 2011/0154662 A1 | 6/2011 | Droz |
| 2011/0169146 A1 | 7/2011 | Ohira et al. |
| 2011/0174884 A1 | 7/2011 | Endres et al. |
| 2011/0186980 A1 | 8/2011 | Lin |
| 2011/0300413 A1 | 12/2011 | Jacobs et al. |
| 2011/0317355 A1 | 12/2011 | Jow |
| 2012/0012659 A1 | 1/2012 | Sugimoto et al. |
| 2012/0103508 A1 | 5/2012 | Xie et al. |
| 2012/0104102 A1 | 5/2012 | Rancien et al. |
| 2012/0181333 A1* | 7/2012 | Krawczewicz .. G06K 19/07707 |
| | | 235/488 |
| 2012/0206869 A1 | 8/2012 | Droz |
| 2013/0009347 A1 | 1/2013 | Feldman et al. |
| 2013/0171423 A1* | 7/2013 | Cruikshank ............ B42D 25/45 |
| | | 347/20 |
| 2013/0255078 A1 | 10/2013 | Cox |
| 2013/0255848 A1 | 10/2013 | Cox |
| 2013/0258622 A1 | 10/2013 | Cox |
| 2013/0260065 A1 | 10/2013 | Cox |
| 2013/0261262 A1 | 10/2013 | Cox |
| 2014/0021261 A1 | 1/2014 | Mosteller |
| 2014/0197626 A1* | 7/2014 | Le Loarer ............ B42D 25/328 |
| | | 428/196 |
| 2015/0014418 A1 | 1/2015 | Ponikwar et al. |
| 2015/0235122 A1 | 8/2015 | Finn et al. |
| 2015/0290872 A1* | 10/2015 | Juriasingani ......... B42D 25/324 |
| | | 264/293 |
| 2015/0294211 A1* | 10/2015 | Nakano ............... G06K 19/0775 |
| | | 235/492 |
| 2015/0327365 A1 | 11/2015 | Cox |
| 2016/0031201 A1 | 2/2016 | Cox |
| 2016/0152815 A1 | 6/2016 | Cox |
| 2016/0203399 A1 | 7/2016 | Cox |
| 2016/0342881 A1 | 11/2016 | Cox |
| 2017/0243104 A1 | 8/2017 | Cox |
| 2017/0262749 A1 | 9/2017 | Cox |
| 2018/0211147 A1 | 7/2018 | Cox |
| 2019/0197381 A1* | 6/2019 | Cox ................. G06K 19/07724 |
| 2019/0204812 A1 | 7/2019 | Cox |
| 2019/0279065 A1 | 9/2019 | Cox |
| 2019/0300695 A1 | 10/2019 | Cox |
| 2020/0070486 A1 | 3/2020 | Ashby et al. |
| 2021/0034942 A1 | 2/2021 | Cox |
| 2022/0215220 A1 | 7/2022 | Mathieu et al. |

FOREIGN PATENT DOCUMENTS

| | | |
|---|---|---|
| CN | 1279797 A | 1/2001 |
| CN | 1305618 A | 7/2001 |
| CN | 1351733 A | 5/2002 |
| CN | 1110014 C | 5/2003 |
| CN | 202862802 U | 4/2013 |
| DE | 3586666 T2 | 2/1993 |
| DE | 69027295 T2 | 1/1997 |
| DE | 19915765 A1 | 10/2000 |
| DE | 69527866 T2 | 4/2003 |
| DE | 10248394 A1 | 5/2004 |
| EP | 0350179 A1 | 1/1990 |
| EP | 0488574 A2 | 6/1992 |
| EP | 0754567 | 1/1997 |
| EP | 1502763 A1 | 2/2005 |
| EP | 2093704 | 8/2009 |
| EP | 2386428 A2 | 11/2011 |
| FR | 2837013 A1 | 9/2003 |
| FR | 2837306 A1 | 9/2003 |
| FR | 2903624 A1 | 1/2008 |
| JP | H0793817 A | 4/1995 |
| JP | 2002261421 A | 9/2002 |
| JP | 2005004429 A | 1/2005 |
| JP | 2009205337 A | 9/2009 |
| JP | 2010250467 A | 11/2010 |
| KR | 1019900001745 B1 | 3/1990 |
| KR | 1020110058183 A | 6/2011 |
| KR | 1020110062486 | 6/2011 |
| WO | 1988002762 A1 | 4/1988 |
| WO | 1998052735 A1 | 11/1998 |
| WO | 1999047331 A1 | 9/1999 |
| WO | 2000030031 A1 | 5/2000 |
| WO | 2008057495 A2 | 5/2008 |
| WO | 2013151850 A1 | 10/2013 |
| WO | 2014039183 A1 | 3/2014 |
| WO | 2014039184 A1 | 3/2014 |
| WO | 2015026612 A2 | 2/2015 |

OTHER PUBLICATIONS

"Material Safety Data Sheet acc. to ISO/DIS 11014 for Trade Name: 9-20557-LV," Dymax Corporation, Mar. 10, 2011.

(56) References Cited

OTHER PUBLICATIONS

"Material Safety Data Sheet acc. to ISO/DIS 11014 for Trade Name: 9-20557," Dymax Corporation, Sep. 21, 2011.
"Multi-Cure® 6-625-SV01-REV-A Adhesives for Metal, Glass and Plastics Product Data Sheet," Dymax Corporation, Sep. 24, 2010.
"Material Safety Data Sheet acc. to ISO/DIS 11014 for Trade Name: 6-625-REV-A," Dymax Corporation, Dec. 9, 2010.
"Product Specification Sheet for Vinyl Chloride/Vinyl Acetate Copolymer," The Dow Chemical Company, 1995, http://www.dow.com/svr/prod/vcvac.htm.
Database WPI Week 201150 Thomson Scientific. London. GB; AN 2011-J56990 XP-002750795. & JP 2011 144213 A (Toray Ind Inc) Jul. 28, 2011 (Jul. 28, 2011) * abstract *.
Database WPI Week 201023 Thomson Scientific. London. GB; AN 2010-C93048 XP-002750796. & JP 2010 059225 A (Toray Ind Inc) Mar. 18, 2010 (Mar. 18, 2010) * abstract *.
Korean Intellectual Property Office, International Search Report and Written Opinion issued on Jul. 17, 2023, for International Patent Application No. PCT/US2022/047260.
Korean Intellectual Property Office, International Search Report and Written Opinion issued on Jul. 13, 2023, for International Patent Application No. PCT/US2022/047278.

* cited by examiner

CORE LAYER FOR INFORMATION CARRYING CARD, RESULTING INFORMATION CARRYING CARD, AND METHODS OF MAKING THE SAME

FIELD OF THE INVENTION

The disclosure relates to information carrying cards such as smart cards generally. More particularly, the disclosed subject matter relates to a core layer for a plurality of information carrying cards, a resulting product comprising the core layer, the resulting information carrying cards, and the methods of making the same.

BACKGROUND

Information carrying cards provide identification, authentication, data storage and application processing. Such cards or parts include key cards, identification cards, telephone cards, credit cards, bankcards, tags, bar code strips, other smart cards and the like. Counterfeiting and information fraud associated with traditional plastic cards causes tens of billions of dollars in the losses each year. As a response, information carrying cards are getting "smarter" to enhance security. Smart card technologies provide solutions to prevent fraud and decrease resulting losses.

Information carrying cards often include an integrated circuit (IC) embedded in a thermoplastic material, such as polyvinyl chloride (PVC). Information has been input and stored in the integrated circuit before a transaction. In use, information carrying cards work in either a "contact" or "contactless" mode. In contact mode, an electronic component on the card is caused to directly contact a card reader or other information receiving device to establish an electromagnetic coupling. In contactless mode, the electromagnetic coupling between the card and the card reading device is established through electromagnetic action at a distance, without the need for physical contact. The process of inputting information into the IC of the information carrying card also works in either of these two modes.

When information carrying cards become "smarter," the amount of information stored in each card often increases, and the complexity of the embedded IC's also increases. The cards also need to withstand flexing to protect sensitive electronic components from damage as well as offer good durability during use. In most of the existing technologies, as a final product, a card is made directly on a card body through a process such as injection molding, bonding, embedding, and encapsulation, in which electronic components are attached or mounted onto the card body or into a cavity on the card body. Such a cavity may have a size the same as or similar to the size of an inlay having the electronic components. Such existing methods can be seen in patents or published patent applications, for example, U.S. Pat. Nos. 5,520,863; 6,902,116; 8,012,809; US 2005/0006463; US 2006/0227523; US 2010/0226107; US 2010/0270373; and US 2012/0103508. The existing processes do not offer a large-scale manufacturing capability, and may not be suitable for sensitive components. It is desired to have a relatively easy and full-scale commercial process having improved productivity at low cost and offering products with good quality and durability.

SUMMARY OF THE INVENTION

The present disclosure provides a core layer for a plurality of information carrying cards, a resulting card product comprising the core layer, the resulting information carrying cards, and the methods of making the same.

In accordance with some embodiments, a method for forming a core layer for a plurality of information carrying cards is provided. A first thermoplastic layer and a plurality of inlay layers are provided. The first thermoplastic layer comprises a thermoplastic material. Each of the plurality of inlay layers comprises at least one electronic component.

A first portion of a crosslinkable polymer composition is dispensed onto the first thermoplastic layer. A second thermoplastic layer is applied over the first portion of the crosslinkable polymer composition and the first thermoplastic layer. The second thermoplastic layer comprises a second thermoplastic material and defines a plurality of through-holes therein. A second portion of the crosslinkable polymer composition is dispensed into each of the plurality of through-holes.

One respective inlay layer is placed over the second portion of the crosslinkable polymer composition inside each of the plurality of through-holes. A third portion of the crosslinkable polymer composition is dispensed over each respective inlay layer.

A third thermoplastic layer or a release film may be applied over the third portion of the crosslinkable polymer composition to provide a layered structure. The third thermoplastic layer comprises a third thermoplastic material. Each respective inlay layer is configured to be movable inside each respective through-hole in the presence of the crosslinkable polymer composition when the layered structure is pressed on a pressure. The respective inlay layer is configured to move freely so as to be self-centered in the crosslinked polymer composition, with respect to the thickness of the second thermoplastic layer and/or with respect to edges of a through-hole.

In some embodiments, each of the first, second, and third thermoplastic layers comprises a thermoplastic material selected from the group consisting of polyvinyl chloride, copolymer of vinyl chloride, polyolefin, polycarbonate, polyester, polyamide, and acrylonitrile butadiene styrene copolymer (ABS). Two or all three of the first, second, and third thermoplastic layers may comprise a same material. They may have the same material type or the same composition. The first and third thermoplastic layers may have a thickness less than that of the second thermoplastic layer. The first and third thermoplastic layers may have the same thickness and are made of the same material composition. Any or all three of the first, second, and third thermoplastic layers may be transparent. For example, in some embodiments, the first and third thermoplastic layers are transparent.

In some embodiments, the at least one electronic component in an inlay layer comprises at least one integrated circuit. The at least one electronic component may also comprise at least one light emitting diode (LED), a battery, a switch, a display screen, or any combination thereof.

The crosslinkable polymer composition comprises a curable precursor, which is a base polymer. The curable precursor may be selected from the group consisting of acrylate, methacrylate, urethane acrylate, silicone acrylate, epoxy acrylate, methacrylate, silicone, urethane and epoxy. In some embodiments, such a base polymer is epoxy or urethane acrylate. The crosslinkable polymer composition may further comprise an initiator and/or curative for curing. Such a crosslinkable composition may be in a form of a liquid or a paste, or may be in a form of a hot melt adhesive.

The crosslinkable polymer composition is cured under a pressure and a temperature. The crosslinkable polymer composition becomes a crosslinked polymer composition, which is in a solid form, but may have flexibility. In some embodiments, the polymer composition is transparent before and after crosslinked.

When a release film is applied to the third portion of the crosslinkable polymer composition, the release film may be peeled off after the crosslinkable polymer composition is cured.

In another aspect, the present discloses provides a core layer for a plurality of information carrying cards as described herein. The core layer comprises a first thermoplastic layer, a plurality of inlay layers, a second thermoplastic layer, and a crosslinked polymer composition. The first thermoplastic layer comprises a thermoplastic material. Each of the plurality of inlay layers comprises at least one electronic component for card functions. The second thermoplastic layer is disposed over the first thermoplastic layer. The second thermoplastic layer comprises a second thermoplastic material and defines a plurality of through-holes therein.

The crosslinked polymer composition includes a first portion, a second portion, and a third portion. The first portion of the crosslinked polymer composition is a layer disposed between the first thermoplastic layer and the second thermoplastic layer. The second portion of the crosslinked polymer composition is disposed inside each of the plurality of through-holes. One respective inlay layer is disposed inside the second portion of the crosslinked polymer composition. The third portion of the crosslinked polymer composition is a layer disposed over each respective inlay layer and on the second thermoplastic layer.

In the core layer, the respective inlay layer is centered inside the second portion of the crosslinked polymer composition inside each of the plurality of through-holes, with respect to a thickness of the second thermoplastic layer and/or edges of a respective through-hole.

In some embodiments, the core layer further comprises a third thermoplastic layer or a release film disposed on the third portion of the crosslinked polymer composition. The release film can be peeled away. The third thermoplastic layer comprises a third thermoplastic material.

Each of the first, second, and third thermoplastic layers comprises a thermoplastic material selected from the group consisting of polyvinyl chloride, copolymer of vinyl chloride, polyolefin, polycarbonate, polyester, polyamide, and acrylonitrile butadiene styrene copolymer (ABS). Two or three of the first, second, and third thermoplastic layers comprise a same material type or a same material of the same composition. In some embodiments, the first and third thermoplastic layers have a same thickness, which is less than that of the second thermoplastic layer. In some embodiments, the first and third thermoplastic layers are transparent. The second thermoplastic layer may be transparent too.

The at least one electronic component may comprise one or more of one integrated circuit, one light emitting diode (LED), a battery, a switch, and a display screen.

The crosslinked polymer composition comprises a base polymer selected from the group consisting of acrylate, methacrylate, urethane acrylate, silicone acrylate, epoxy acrylate, methacrylate, silicone, urethane and epoxy. The crosslinked polymer composition is transparent in some embodiments.

In another aspect, the present disclosure also provides a method for making a plurality of information carrying cards or an information carrying card. Such a method comprises forming a core layer as described herein. Such a method may further comprise laminating a printable thermoplastic film on one side of the core layer. A transparent thermoplastic film may be further laminated on each side of the core layer before or after the printable thermoplastic film is laminated. The lamination can be achieved thermally. The core layer with the printable thermoplastic film and optionally a transparent thermoplastic film can be cut to provide a plurality of the information carrying cards.

In another aspect, the present disclosure also provides an information carrying card, which comprises a first thermoplastic layer, an inlay layer, a second thermoplastic layer, and a crosslinked polymer composition. The first thermoplastic layer comprises a thermoplastic material. The inlay layer comprises at least one electronic component. The second thermoplastic layer is disposed over the first thermoplastic layer. The second thermoplastic layer comprises a second thermoplastic material and defines a through-hole therein.

The crosslinked polymer composition includes a first portion, a second portion, and a third portion. The first portion of the crosslinked polymer composition is a layer disposed between the first thermoplastic layer and the second thermoplastic layer. The second portion of the crosslinked polymer composition is disposed inside the through-hole. The inlay layer is disposed inside the second portion of the crosslinked polymer composition. The third portion of the crosslinked polymer composition is a layer disposed over the inlay layer and on the second thermoplastic layer. The inlay layer is centered inside the through-hole with respect to a thickness of the second thermoplastic layer and/or edges of a respective through-hole.

In some embodiments, the information carrying card further comprises a third thermoplastic layer disposed on the third portion of the crosslinked polymer composition. The third thermoplastic layer comprises a third thermoplastic material.

The information carrying card may further comprise at least one printable thermoplastic film and optional a transparent thermoplastic film bonded onto the first thermoplastic layer, or the third thermoplastic layer, or the third portion of the crosslinked polymer composition.

In some embodiments, each of the first, second, and third thermoplastic layers comprises a thermoplastic material selected from the group consisting of polyvinyl chloride, copolymer of vinyl chloride, polyolefin, polycarbonate, polyester, polyamide, and acrylonitrile butadiene styrene copolymer (ABS). Two or three of the first, second, and third thermoplastic layers comprise a same material type or a same material having a same composition.

Each layer may have a suitable thickness. In some embodiments, the first and third thermoplastic layers have a same thickness, which is less than that of the second thermoplastic layer, and are transparent. The at least one electronic component comprises one or more of one integrated circuit, one light emitting diode (LED), a battery, a switch, and a display screen. The crosslinked polymer composition may comprise a base polymer selected from the group consisting of acrylate, methacrylate, urethane acrylate, silicone acrylate, epoxy acrylate, methacrylate, silicone, urethane and epoxy. The crosslinked polymer composition may be transparent.

In accordance with some embodiments, a plurality of tabs are disposed around the plurality of through-holes in the second thermoplastic layer and below the second thermoplastic layer. The tabs and the corresponding locations of the second thermoplastic layer may define holes going through both layers and are configured to let the crosslinkable polymer composition flow through the holes. This design is useful to prevent a very thin inlay layer from getting below the second thermoplastic layer. The tabs and the second thermoplastic layer can be bonded or separate from each other. Around each through-hole, there may be any suitable number of tabs, for example, two, three, or four tabs. In some embodiments, other than a plurality of tabs separately used, an inlay layer may comprises a protruding or convex structure functioning as a built-in tab in each corner of the inlay layer. The separate or built-in tabs stay in the product structure after the crosslinkable polymer composition is cured. So the resulting core layer and the information carrying cards also comprise the separate or built-in tabs as described herein. The tabs may comprise any suitable materials such as plastics or metal. In some embodiments, a tab is a thin film of 0.0254 mm or less thick and made of a transparent polymer such as PVC.

The core layer comprising a crosslinkable polymer composition can be made through a lamination process, for example, a thermal lamination process, and is suitable for making a plurality of information carrying cards simultaneously. The processes for making the core layer and making the cards can be separately performed in two different locations at different time. The core layer and the resulting information carrying card have unique structures and performance in addition to processing advantages. The core layer and the information carrying card are in a flat plane, and inlay layers can self-center inside the crosslinkable and crosslinked composition. The core layer and resulting card products carry no or very little residue stress, and have no warpage. The core layer and the information carrying card have good flexibility and durability. In addition to mild processing condition, the core layers and the information carrying card offers good protection to sensitive electronic components.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 1 illustrates a first thermoplastic layer.

FIG. 2 illustrates a first portion of a crosslinkable polymer composition disposed on the first thermoplastic layer of FIG. 1.

FIG. 3 illustrates a second thermoplastic layer having a plurality of through-holes disposed over the crosslinkable polymer composition and the first thermoplastic layer of FIG. 2.

FIG. 4 illustrate a second portion of a crosslinkable polymer composition disposed inside the plurality of through-holes of the second thermoplastic layer as shown in FIG. 3.

FIG. 5 is a cross section view of the layers after an inlay layer is disposed partially or fully inside the through-holes of the second thermoplastic layer as shown in FIG. 4.

FIG. 6 is a magnified view illustrating a portion of FIG. 5.

FIG. 7 illustrates a third portion of the crosslinkable polymer composition dispensed over the layers of FIG. 6.

FIG. 8 illustrates a third thermoplastic layer disposed over the third portion of the crosslinkable polymer composition of FIG. 7.

FIG. 9 is a cross section view of the resulting core layer after the crosslinkable polymer composition in the layers of FIG. 8 is cured (i.e., cross-linked).

FIG. 10 is a magnified view illustrating a portion of FIG. 9.

DETAILED DESCRIPTION

Figure 1:
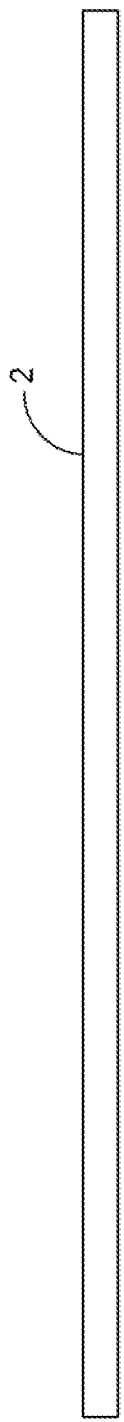
FIGS. 1-10 illustrate cross section views of layered structures at different steps in an exemplary method of forming a core layer of a plurality of information carrying cards, in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

For brevity, unless expressly stated otherwise, references to "information carrying card" or "smart card" made throughout this description are intended to encompass at least key cards, identification cards, telephone cards, credit cards, bankcard, power cards, biometric cards, tags, bar code strips, any part comprising an integrated circuit (IC), and the like. "Information carrying card" or "smart card" also includes a wide variety of shapes, which include but are not limited to rectangular sheets, circular sheets, strips, rods and rings. "Information carrying card" or "smart card" also includes any information carrying parts of both "contact" and "contactless" modes. "Information carrying card" or "smart card" also encompasses any information carrying cards with or without an on-board power supply. An information carrying card comprising a power supply is also referred as a "power card."

The term "core layer" used herein is intended to encompass a layered structure comprising at least one thermoplastic layer and one or a plurality of inlay layers, and such a core layer can be used for making one or a plurality of information carrying cards. Such a core layer may be laminated with a printable or printed thermoplastic layer on at least one side or both sides to provide one or a plurality of information carrying card. A transparent film may be optionally further laminated on one side or both sides before or after a printable or printed thermoplastic layer is laminated. The core layer can be made in a process separate from a process for making one or more information carrying cards, and can be shipped to a different location for making the final cards.

The term "inlay layer" used herein refers to a layer comprising electronic components, which may be embedded or surface-mounted on a supporting film and provide one or more functions of an information carrying card to be made. Such electronic components are connected via conductive lines or wireless connections.

As used herein, the term "transparent" is intended to denote that the article, at a thickness, for example, 0.5 mm, has a transmission of greater than about 85% in the visible region of the spectrum (400-700 nm). For instance, a plastic layer may have greater than about 85% transmittance in the visible light range, such as greater than about 90%, greater than about 95%, or greater than about 99% transmittance, including all ranges and subranges therebetween.

As used herein, the term "translucent" is intended to denote that the article at a thickness, for example, 0.5 mm, has a transmission of greater than about 50% but less than about 85% in the visible region of the spectrum (400-700 nm).

The inventor of the present disclosure has invented and patented technologies on methods for making a core layer for information carrying cards and resulting products. For example, a method for forming a core layer of an information carrying card has been patented and described, for example, in U.S. Pat. No. 9,594,999. In such a method, a thermoplastic layer defining at least one cavity extending from a major surface is provided or formed. The thermoplastic layer comprises at least one thermoplastic material. An inlay layer comprising printed circuit board (PCB) is disposed partially or fully into the at least one cavity. A crosslinkable polymer composition is dispensed over and directly contacting the inlay layer in the at least one cavity so as to form the core layer for an information carrying card. The crosslinkable polymer composition is cured to form a crosslinked polymer composition. The resulting core layer and information carrying card are patented and described, for example, in U.S. Pat. No. 9,439,334. The inlay layer may be fixed on the bottom of a cavity inside the thermoplastic layer, or attached with an edge of the thermoplastic layer to form a cantilever structure as described in U.S. Pat. No. 10,339,434.

The present disclosure provides a core layer for a plurality of information carrying cards, a resulting card product comprising the core layer, the resulting information carrying cards, and the methods of making the same.

Figure 16:
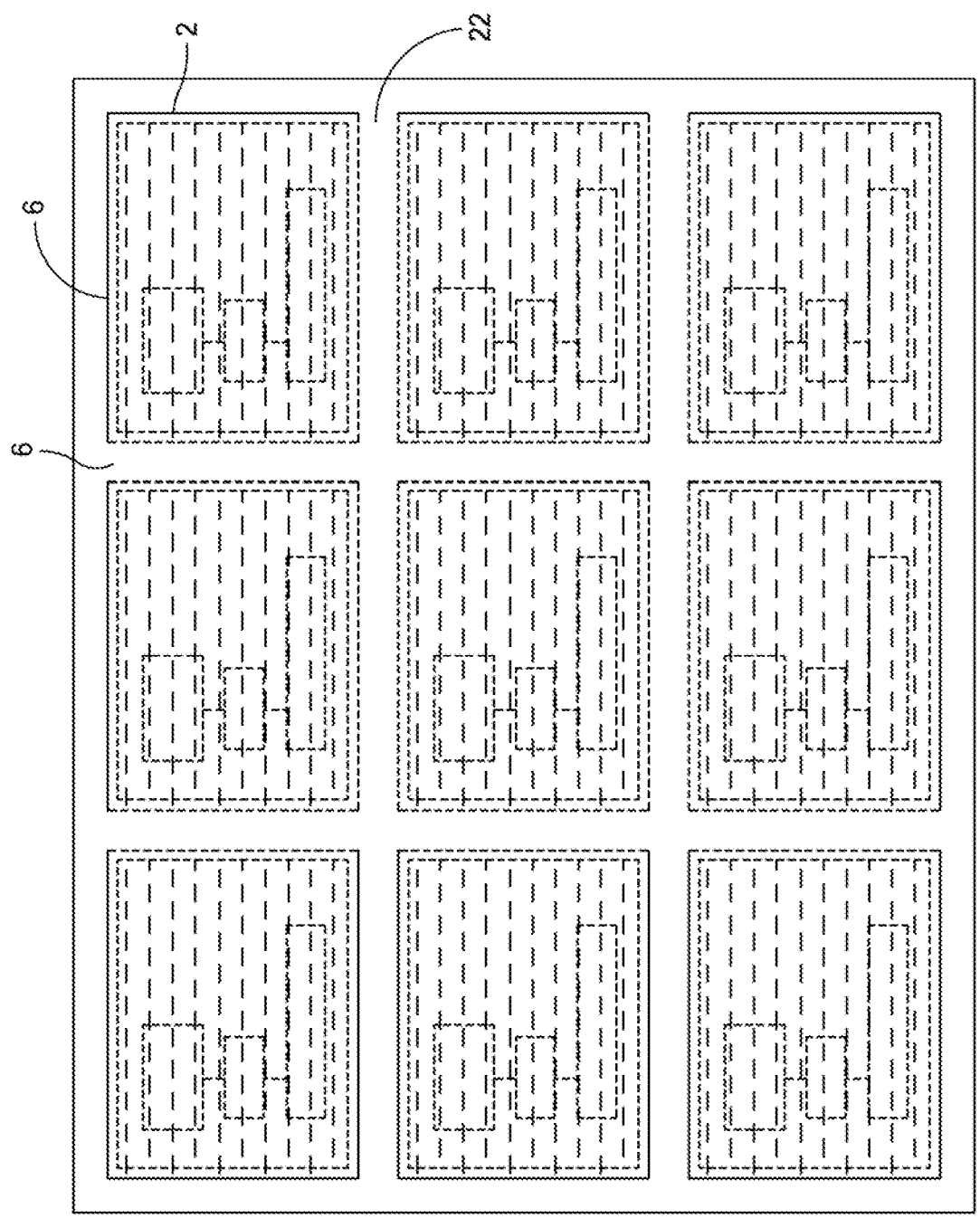
Figure 17:
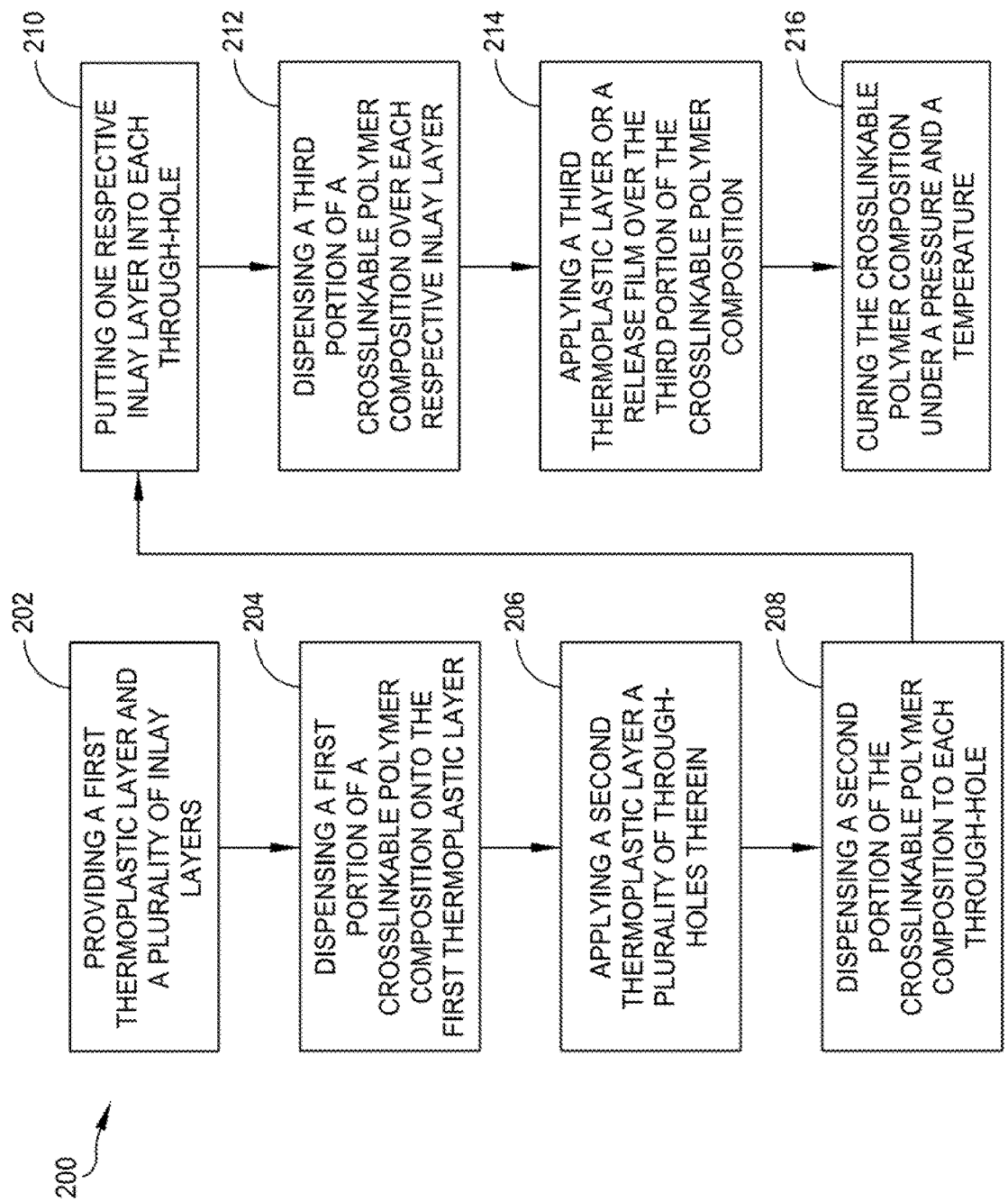
FIG. 17 is a flow chart diagram illustrating an exemplary process of forming a core layer for a plurality of information carrying cards in accordance with some embodiments.

In FIGS. 1-16, 18, and 20-21, like items are indicated by like reference numerals, and for brevity, descriptions of the structure, provided above with reference to the preceding figures, are not repeated. The methods described in FIGS. 17 and 19 are described with reference to the exemplary structure described in FIGS. 1-16, 18, and 20-21.

Figure 11:
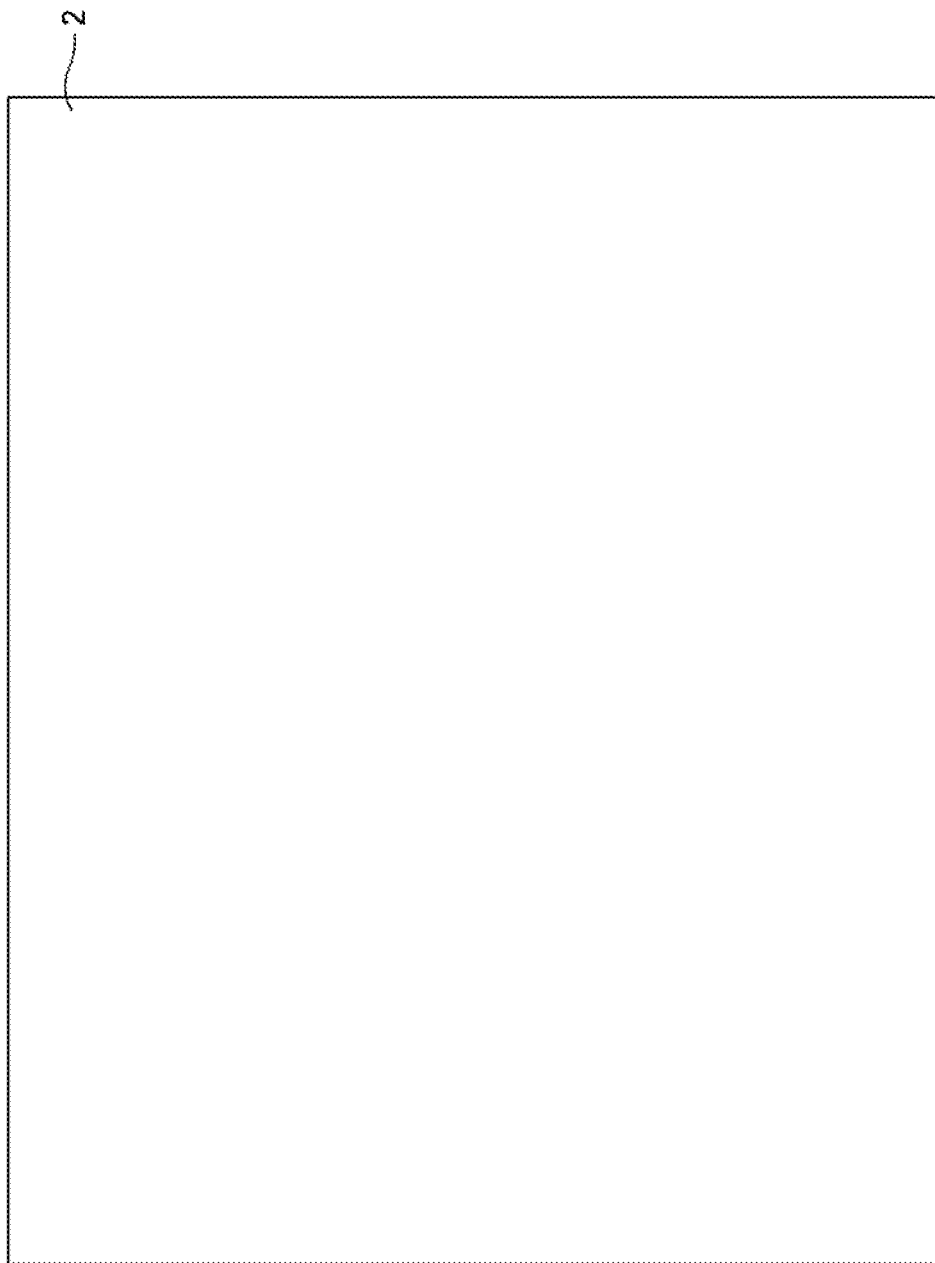
FIGS. 11-16 are plan views illustrating the structures shown in FIGS. 1-5 and 8, respectively.

Referring to FIG. 1, a first thermoplastic layer 2 is provided. A plan view of the first thermoplastic layer 2 is illustrated in FIG. 11. The first thermoplastic layer 2 comprises a thermoplastic material. Examples of a suitable first thermoplastic layer 2 include, but are not limited to, polyvinyl chloride (PVC), a copolymer of vinyl chloride, polyolefin, polycarbonate, polyester, polyamide, acrylonitrile butadiene styrene copolymer (ABS), and the like or a combination thereof. The first thermoplastic layer 2 may be a PVC, a copolymer of vinyl chloride and another monomer such as vinyl ether, vinyl ester or vinyl acetate, or a PVC modified with a vinyl chloride copolymer. Examples of PVC films suitable for use are available from suppliers such as Klockner Pentaplast of America, Inc. of Gordonsville, VA; and Shijiazhuang Eurochem Co. Ltd of China. Examples of such a vinyl chloride copolymer resin are available from Dow Chemical Company under trade name of UCAR®, and from BASF of Ludwigshafen, Germany under trade name of LAROFLEX®. UCAR® is a copolymer of vinyl chloride and vinyl acetate, and includes grades such as YYNS-3, VYHH and VYHD. LAROFLEX® is a copolymer of vinyl chloride and vinyl isobutyl ether, and includes grades such as MP25, MP 35, MP45 and MP60. These polymer resins may be supplied as fine powder, which is added to modify PVC resins for films. In some embodiments, such a thermoplastic layer can be transparent or translucent.

The first thermoplastic layer 2 may have a thickness in a range of from 0.01 mm to 0.05 mm in some embodiments.

Figure 2:
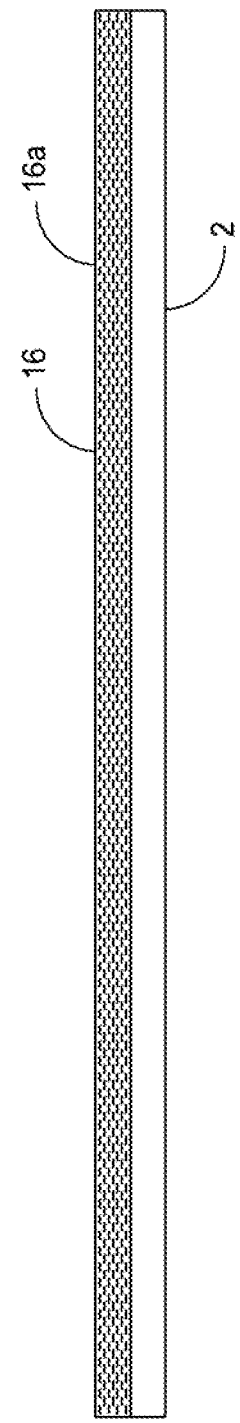
Figure 12:
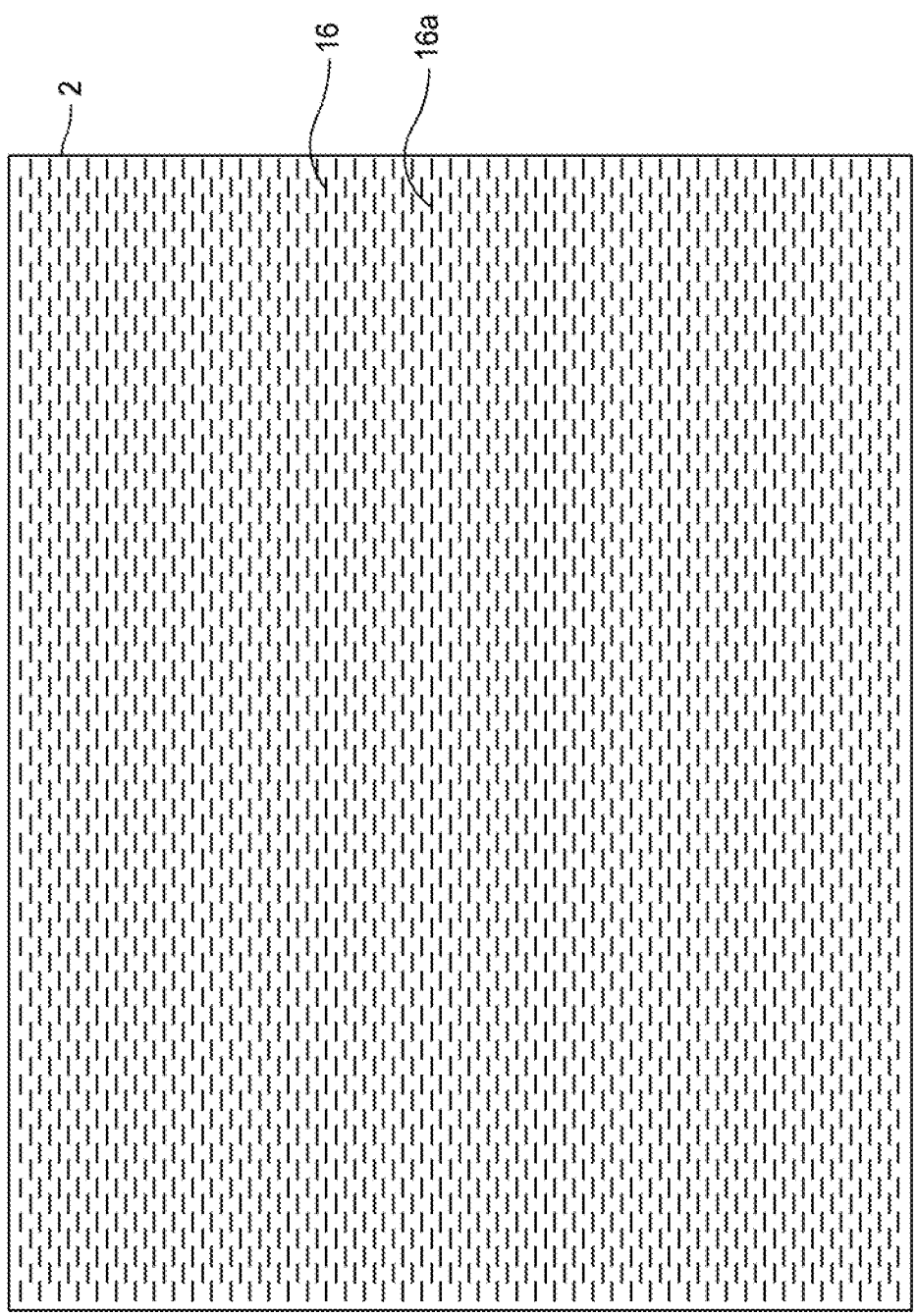

Referring to FIG. 2, a first portion 16a of a crosslinkable polymer composition 16 is dispensed onto the first thermoplastic layer 2. A plan view of the resulting structure is illustrated in FIG. 12. In FIG. 12, a crosslinkable polymer composition 16 is shown for illustration only, and it may be patterned as described herein. In some embodiments, the areas close to the edge of the first thermoplastic layer 2 may not be coated with the crosslinkable polymer composition 16 in some embodiments.

A cross-linkable polymer composition 16 used often comprises a curable base polymer resin in a liquid or paste form or may be in a form of a hot melt adhesive. The cross-linkable polymer composition also comprises at least one initiator and/or curative for thermal curing, thermal curing, or a combination thereof. The cross-linkable polymer composition may optionally comprises other additives or fillers such as a particulate thermoplastic filler. The base polymer resin may be selected from the group consisting of urethane acrylate, ester acrylate, silicone acrylate, epoxy acrylate, acrylate, epoxy, and urethane. The acrylate may be a methacrylate. The particulate thermoplastic filler may be polyolefin, polyvinyl chloride (PVC), a copolymer of vinyl chloride and at least another monomer, or a polyester such as polyethylene terephthalate (PET). The particulate thermoplastic filler may be a compound or a blend comprising a thermoplastic resin, for example, a compound or a blend comprising PVC or a vinyl chloride copolymer. The at least another monomer in the vinyl chloride co-polymer may be vinyl ester, vinyl acetate or vinyl ether.

The base polymer resin may be an oligomer or prepolymer having functional groups. The base polymer can be cross-linkable under a regular curing conditions including but not limited to heating, radiation such as ultraviolet (UV) light, moisture and other suitable conditions. The base polymer may be in liquid or paste form. Its viscosity may be in the range of 100-100,000 cps, for example, from 1,000 cps to 20,000 cps, from 2,000 cps to 20,000 cps, from 3,000 cps to 12,000 cps, or from 3,000 cps to 8,000 cps. In some embodiments, the base polymer resin is urethane acrylate or epoxy.

A particulate thermoplastic filler, which may be included in the crosslinkable polymer composition 16 may be any polymer which, when heated, will melt. Examples of a thermoplastic filler include, but are not limited to polyolefin, PVC, polyester, copolymer, terpolymer and the like. A powdered polymer that provides adequate results may be a compound or a blend comprising PVC, or a modified PVC. One suitable example of the particulate thermoplastic filler comprises a copolymer of vinyl chloride and at least another monomer, which may be vinyl ester, vinyl acetate or vinyl ether. Examples of such a copolymer are available from Dow Chemical Company under trade name of UCAR™, and from BASF of Ludwigshafen, Germany under trade name of Laroflex™. UCAR™ is a copolymer of vinyl chloride and vinyl acetate. The grades include YYNS-3, VYHE1 and VYHD. Laroflex™ is a copolymer of vinyl chloride and vinyl isobutyl ether. The grades include MP25, MP 35, MP45 and MP60. All of these polymer resins are often supplied in the form of fine powder. One example of a thermoplastic filler is a PVC modified with a copolymer of vinyl chloride and at least another monomer such as vinyl ester, vinyl acetate or vinyl ether. In such an example, the ratio of PVC and the copolymer can be in a suitable ratio such as the range of 99:1 to 1:99 or in the range of 95:5 to 80:20 in some embodiments.

The particulate thermoplastic filler might be obtained through suspension or emulsion polymerization of one or more corresponding monomers or, through pulverization of solid plastics. Pulverization of the solid polymers may be achieved through a mechanical method, a freezing grinding method or a solution method. The particulate form can be of any size, by way of example and no limitation; the particles may be in the range of 0.5-100 microns, for example, from 0.5 micron to 50 microns, or from 0.5 micron to 10 microns.

The initiator and/or curative may be based on general principles of polymer chemistry. In some embodiments, the composition comprises thermal curing mechanism only, and can be cured at relatively low temperature such as above 40° C. and less than 150° C. or 120° C. In some embodiments, the composition comprises a dual curing mechanism. For example, the cross-linkable composition comprises a first curative for thermal curing and a second curative for radiation curing. During the curing or cross-linking reaction, such a cross-linkable composition transforms into a solid cross-linked polymer composition. Such a cross-linked polymer composition is also known in the art as a "thermosetting" polymer or "thermoset" to distinguish it from a thermoplastic polymer, which does not have a crosslinked structure. In some embodiments, the cross-linkable polymer composition comprises a range of from about 60 wt. % to about 99.5 wt. %, and preferably in the range of about 50 wt. % to about 95 wt. %, of the base polymer. The cross-linkable polymer composition optionally comprises a range of about 0.5 wt. % to about 40 wt. % such as about 5 wt. % to about 15 wt. %, of the additives such as a particulate thermoplastic filler. It is preferably to have a transparent crosslinkable polymer composition, which retains transparency after crosslinked.

Such a cross-linkable polymer composition 16 is transformed into a cross-linked polymer composition after a curing reaction under suitable conditions, for example, under a thermal or radiation condition or a thermal condition in combination with a radiation condition. The radiation can be ultra-violet (UV), visible light, or infra-red (IR). In some embodiments, under such a thermal condition, the curing reaction occurs at a relatively low temperature, for example, less than 150° C., less than 120° C., or less than 100° C. Exemplary suitable temperature may be in a range of from 40° C. to 150° C., from 40° C. to 120° C., from 40° C. to 100° C., from 50° C. to 150° C., from 50° C. to 120° C., from 50° C. to 100° C., from 60° C. to 150° C., from 60° C. to 120° C., from 60° C. to 100° C., from 70° C. to 150° C., from 70° C. to 120° C., or from 70° C. to 100° C.

The cross-linkable polymer composition 16 can be dispensed using a suitable dispensing apparatus or equipment for adhesives, encapsulants, sealants and potting compounds, for example, a robot with dispensing function. The amount to the cross-linkable polymer composition 16 to be dispensed can be calculated and controlled. For example, the thickness of the cross-linkable polymer composition 16 may be about 0.025 mm or less, for example, in a range of from 0.005 mm to 0.025 mm.

Figure 3:
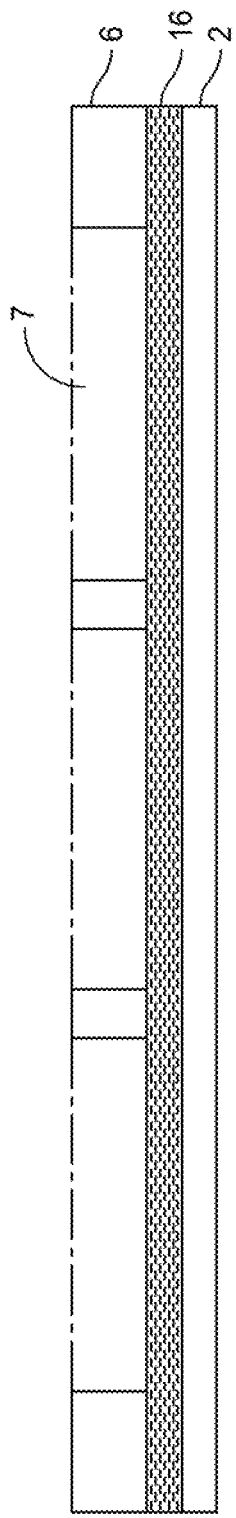
Figure 13:
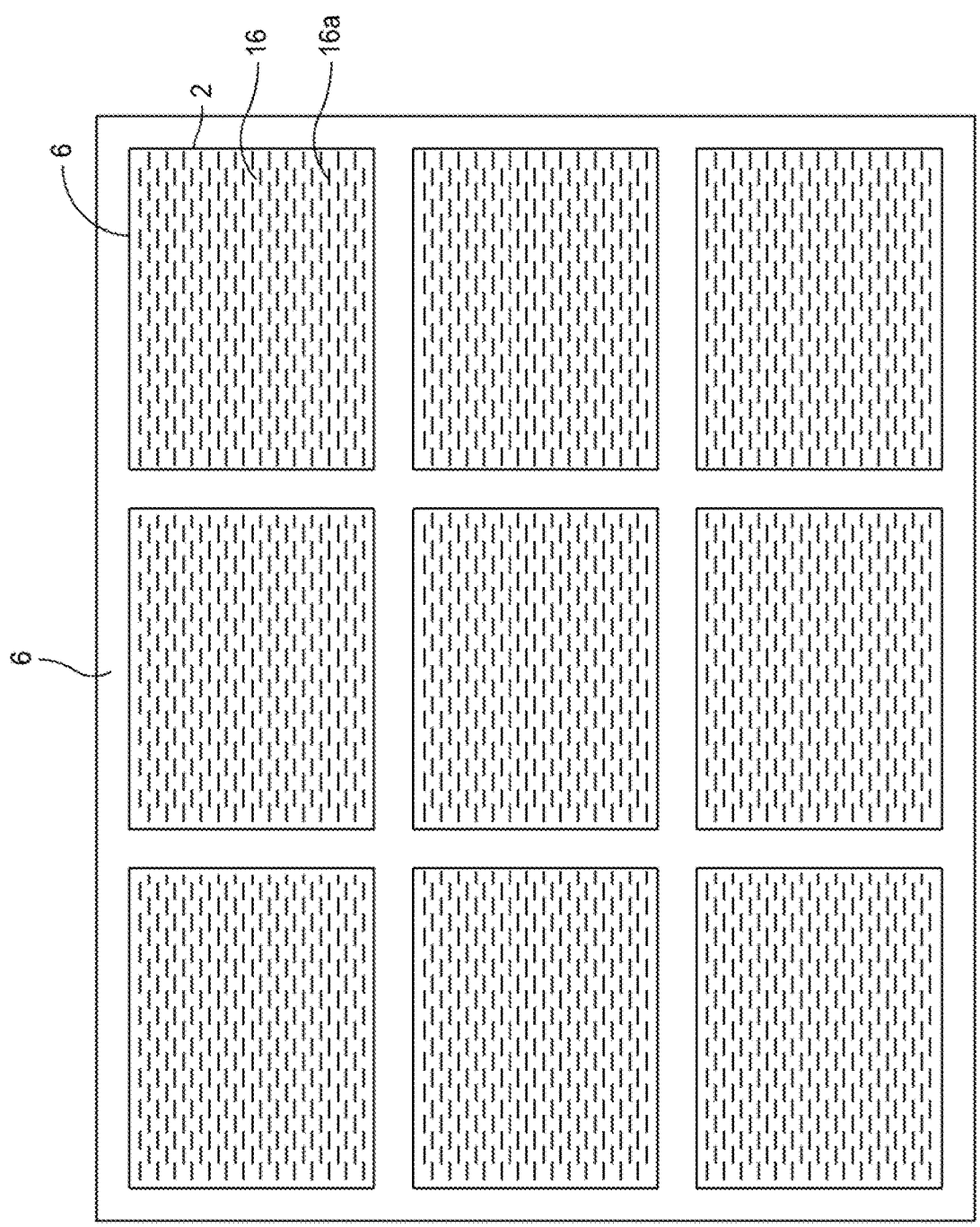

Referring to FIG. 3, a second thermoplastic layer 6 is disposed over the first portion of the crosslinkable polymer composition 16 and the first thermoplastic layer 2. A plan view of the resulting structure is illustrated in FIG. 13.

The second thermoplastic layer 6 comprises a second thermoplastic material and defines a plurality of through-holes 7 therein. The composition of the second thermoplastic layer 6 may have a composition as described for the first thermoplastic layer 2. The second thermoplastic layer 6 and the first thermoplastic layer 2 may have the same material type or the same composition. The second thermoplastic layer 6 may comprise any suitable number of through-holes 7, which may be arranged in any configuration. The through-holes may be in any array form by m×n, where m and n are two integers. The nine (3×3) through-holes are for illustration only. For example, the second thermoplastic layer 6 may have 2×2, 3×3, 4×4, 5×5, 6×6, 7×7, 8×8, 9×9, 10×10, 4×8, 4×9, 4×10, 5×6, 5×7, 5×8, 5×10, or any suitable combination. The number of the through-holes may be a number of a plurality of information carrying cards to be made at the same time as described herein. Each through-hole 7 in the second thermoplastic layer 6 may be in any suitable shape such as rectangular, square, oval or circle, and may have a size of 50-90% of the size for an information carrying card to be made.

Referring back to FIG. 3, the first portion 16a of the crosslinkable polymer composition 16 may be dispensed onto so as to cover the first thermoplastic layer 2, or dispensed in a pattern according to the pattern on the second thermoplastic layer 6 so that the crosslinkable polymer composition 16 is disposed between and contacting the first thermoplastic layer 2 and the second thermoplastic layers 6. The areas below the through-holes may not contain the crosslinkable polymer composition 16 according to such a pattern in some embodiments. The areas close to the edges of the first thermoplastic layer 2 may not be coated in some embodiments.

The second thermoplastic layer 6 may have a thickness in a range of from 0.1 mm to 1.1 mm in some embodiments. Either side of the second thermoplastic layer 6 may be optionally coated with an adhesive to enhance adhesion with other materials such as the crosslinkable polymer composition.

Figure 4:
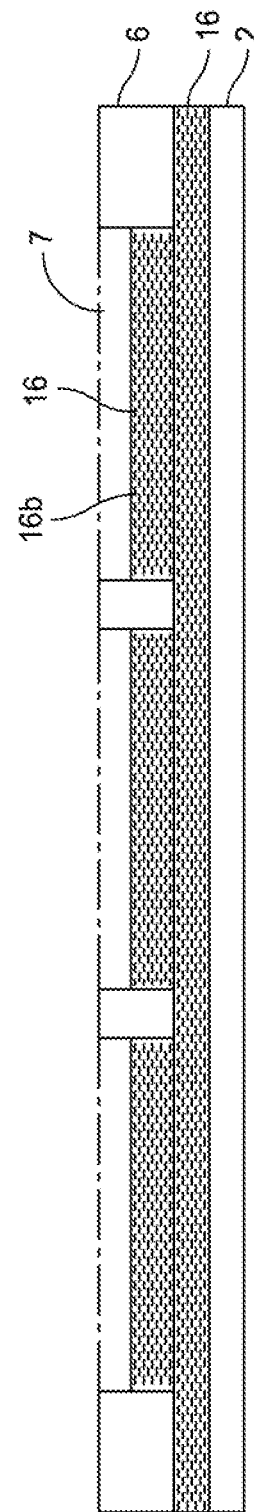
Figure 14:
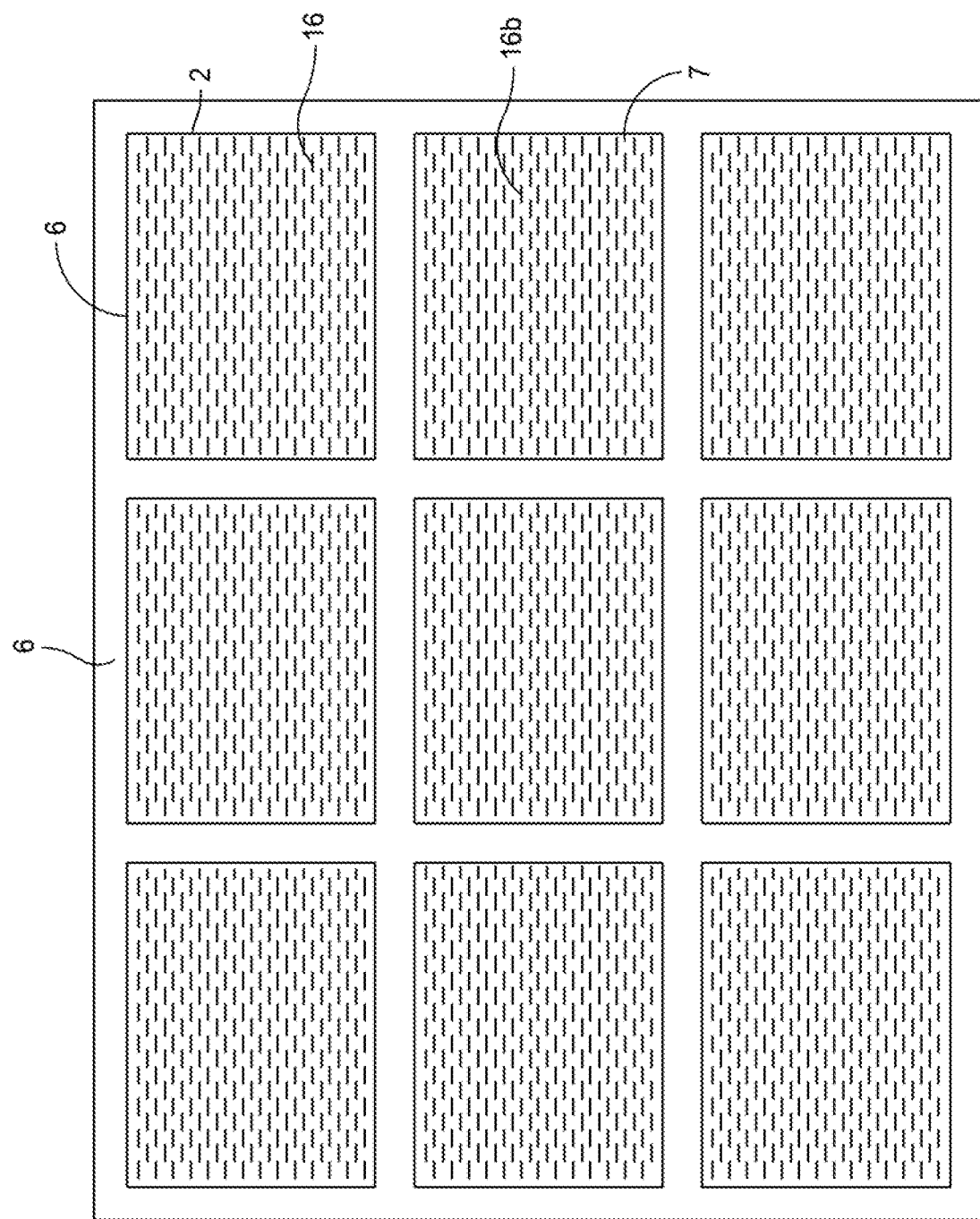

Referring to FIG. 4, a second portion 16b of the crosslinkable polymer composition 16 is dispensed into each of the plurality of through-holes 7. The amount to the crosslinkable polymer composition 16 to be dispensed can be calculated and controlled, for example, to fill about 50-70% of each cavity formed by a through-hole with a bottom defined by the first thermoplastic layer 2. A plan view of the resulting structure is illustrated in FIG. 14.

Figure 5:
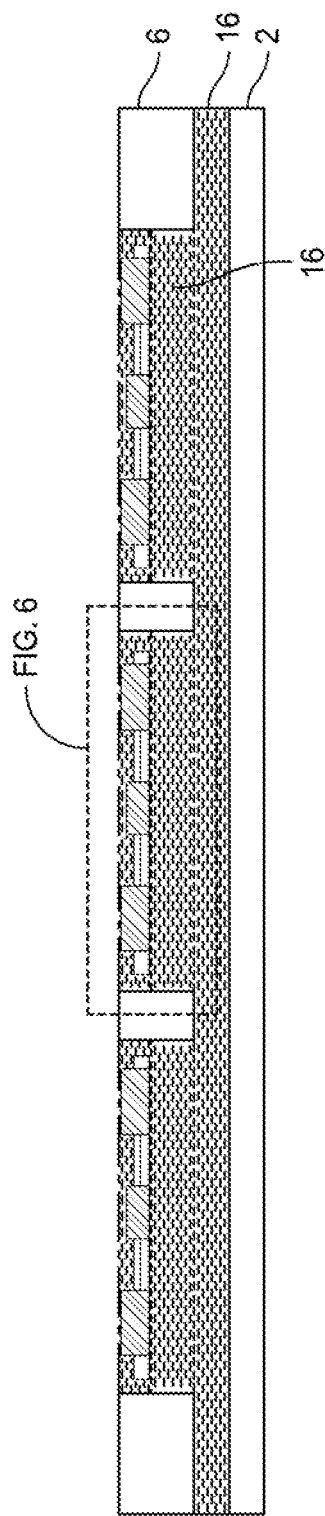
Figure 6:
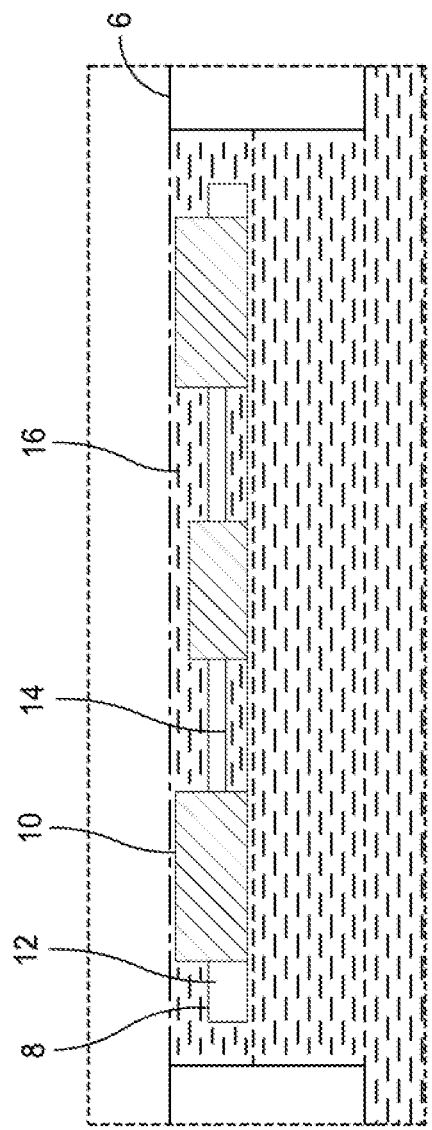
Figure 15:
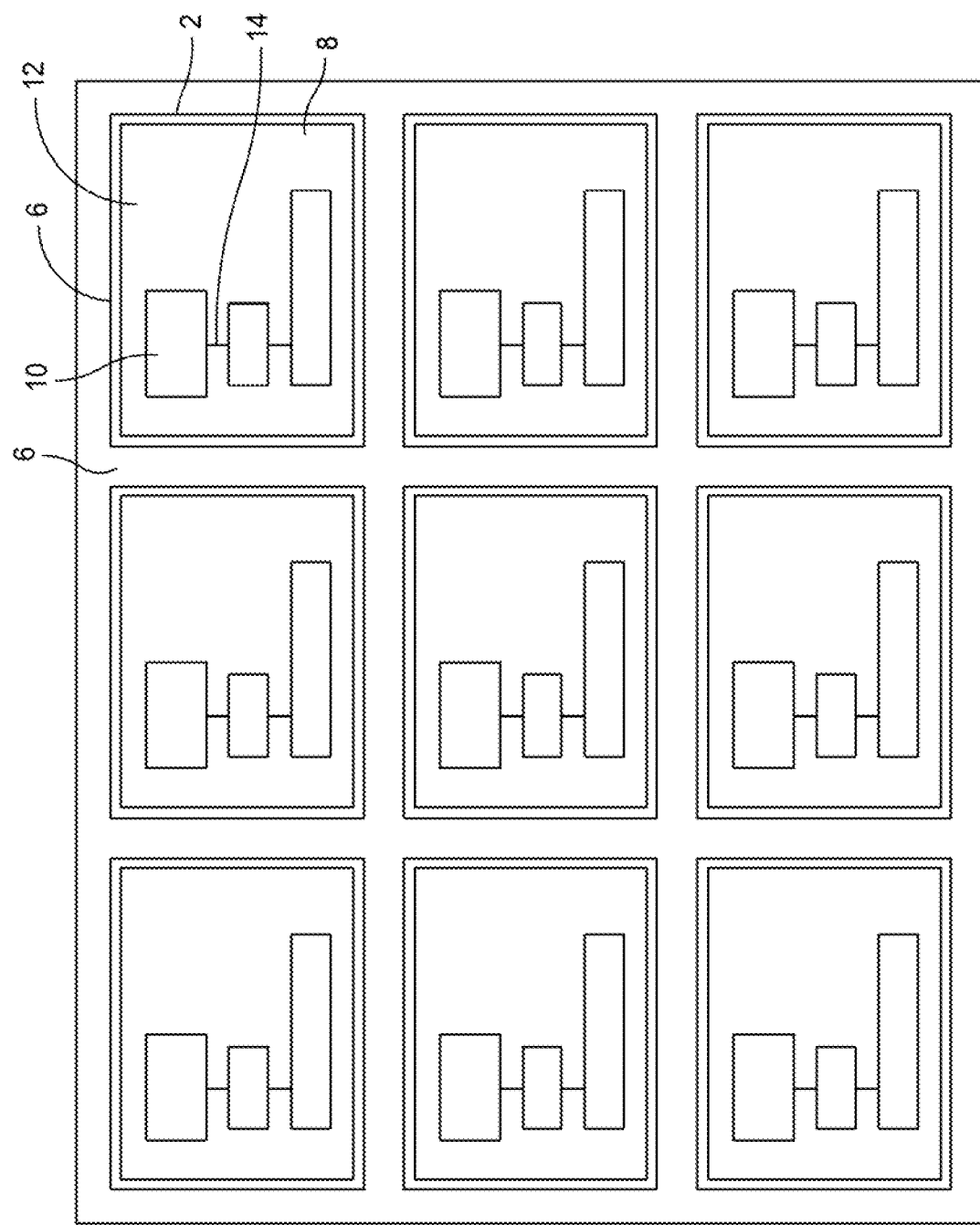

Referring to FIGS. 5 and 6, a plurality of inlay layers 8 are provided. Each of the plurality of inlay layers 8 comprises at least one electronic component 10. As illustrated in FIG. 5, one respective inlay layer 8 is placed over the second portion of the crosslinkable polymer composition 16 inside each of the plurality of through-holes 7. A plan view of the resulting structure is illustrated in FIG. 15. Referring to FIG. 6, the at least one electronic component 10 in an inlay layer 8 comprises at least one integrated circuit. The at least one electronic component may also comprise at least one light emitting diode (LED), a battery, a switch, a display screen, or any combination thereof.

In some embodiments, an inlay layer 8 comprises at least one printed circuit board (PCB) having at least one active or passive electronic component 10 embedded or surface-mounted on a supporting film 12. Examples of supporting film 12 include but are not limited to polyimide, polyester such as PET, glass filled epoxy sheet such as FR-4. A printed circuit board (PCB) having all the components are abbreviated as PCBa. For brevity, the references to PCB in this disclosure will be understood to encompass any PCBs including PCBa. In additional PCB, the inlay layer 8 may comprise an etched circuit, conductive metal or metallic layer or layers creating circuits. Examples of electronic component 10 inside inlay layer 8 include but are not limited to active or passive electronic components, e.g., an integrated circuit (IC), a battery for a "power card," an antenna, and a functional component such as light emitting diodes (LED). Electronic components are interconnected via wires or traces 14. Supporting film 12 may be a polymer based dielectric material. In some embodiments, inlay layer 8 may comprise a piece of metal, ceramic or plastics, which may be for the weighing effect only.

Inlay layer 8 may have any dimension relative to the size of a through-hole 7 in second thermoplastic layer 6. Inlay layer 8 may be fully disposed in such a through-hole. Preferably, in some embodiments, the size of the through-hole on second thermoplastic layer 6 is larger than the size of inlay layer 8. Inlay layer 8 may be fully disposed in a through-hole. Examples of electronic component 10 include but are not limited to a battery or an active or passive electronic component, e.g., an integrated circuit (IC) in inlay layer 8.

Each inlay layer 8 may have any suitable size, which might be smaller than the size of opening of a through-hole 7. The size and the shape in FIG. 15 are for illustration only. The size of each inlay layer 8 might be significantly smaller than that of the opening of the through-hole 7. The inlay layer 8 may have any regular or irregular shape.

The inlay layer 8 may be placed one by one separately, or a plurality of inlay layer 8 are applied simultaneously based on matching registration. The plurality of inlay layer 8 may be held by one carrier.

Figure 7:
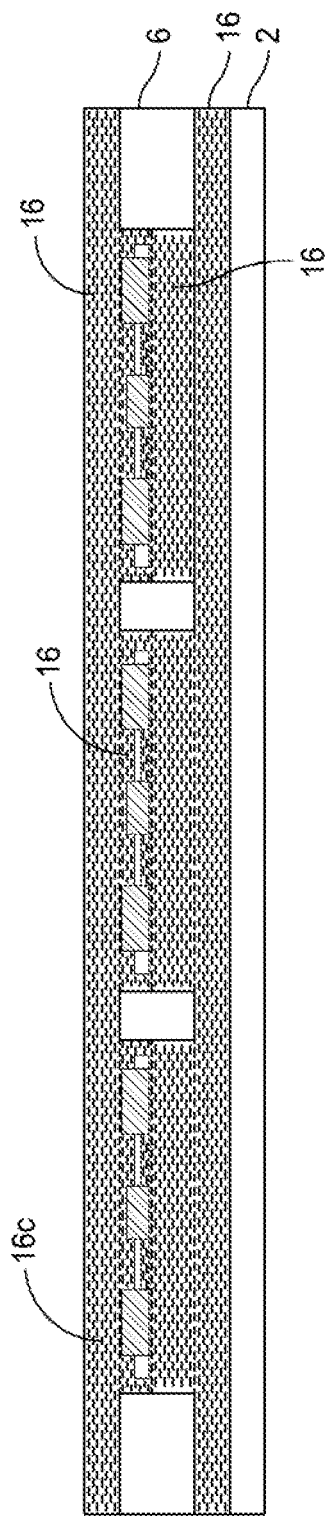

Referring to FIG. 7, a third portion 16c of the crosslinkable polymer composition 16 is dispensed over each respective inlay layer 8. Such crosslinkable polymer composition fill the through-holes first and may also spread onto the second thermoplastic layer 6 to form a layer. For example, the thickness of such portion of cross-linkable polymer composition 16 above the second thermoplastic layer 6 may be about 0.025 mm or less, for example, in a range of from 0.005 mm to 0.025 mm.

Figure 8:
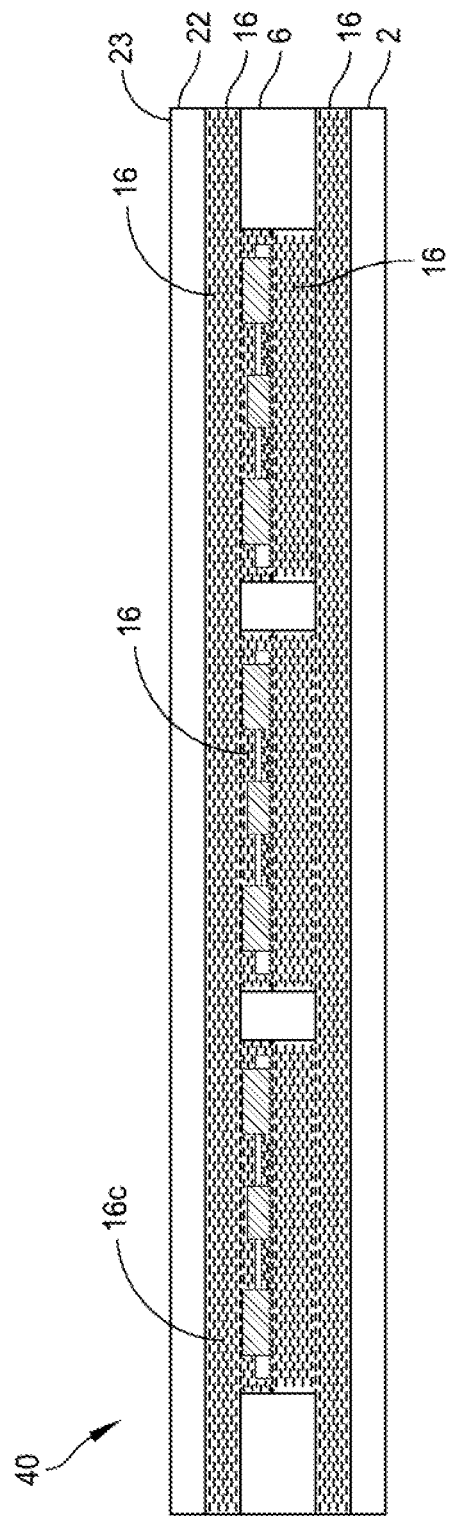

Referring to FIG. 8, a third thermoplastic layer 22 or a release film 23 may be applied over the third portion of the crosslinkable polymer composition 16 to provide a layered structure 40 as shown in FIG. 8. A plan view of the resulting structure is illustrated in FIG. 16. The third thermoplastic layer 22 comprises a third thermoplastic material, and may have a composition for the first thermoplastic layer 2 as described above. The third thermoplastic layer 22 may have a thickness in a range of from 0.01 mm to 0.05 mm in some embodiments.

The release film 23 may be a sheet of polytetrafluoroethylene under the trade name Teflon®, any other fluoropolymer, silicone, a fluoropolymer or silicone coated films. Sometimes a breathable release film is used. Examples of a breathable release film is a silicone coated paper.

Each respective inlay layer 8 is configured to be movable inside each respective through-hole 7 in the presence of the crosslinkable polymer composition 16 when the layered structure 40 is pressed on a pressure. The respective inlay layer 8 is configured to move freely so as to be self-centered in the crosslinkable or later crosslinked polymer composition 16 or 26, with respect to the thickness of the second thermoplastic layer 6 and/or with respect to edges of a through-hole 7. In some embodiments, the respective inlay layer 8 are not in contact with an edge of the respective through-hole 7.

The first, second, and third thermoplastic layers may comprise or be made of any suitable materials and have any suitable thickness. In some embodiments, two or all three of the first, second, and third thermoplastic layers 2, 6, and 22 may comprise a same material. They may have the same material type or the same composition such as PVC. The first and third thermoplastic layers 2 and 22 may have a thickness less than that of the second thermoplastic layer 6. The first and third thermoplastic layers 2 and 22 may have the same thickness and are made of the same material composition. For example, in some embodiments, the first and third thermoplastic layers 2 and 22 may have a thickness of about 0.025 mm while the second thermoplastic layer 6 may have a thickness of about 0.33 mm. The first portion and the third portion of polymer composition may have a thickness of about 0.025 mm before and after cured. Each through-hole 7 in the second thermoplastic layer 6 may be in any suitable shape such as rectangular, square, oval or circle, and may have a size of 50-90% of the size for an information carrying card to be made. The first and third thermoplastic layers 2 and 22 may not have any hole therein in some embodiments.

Any or all three of the first, second, and third thermoplastic layers 2, 6 and 22 may be transparent. For example, in some embodiments, the first and third thermoplastic layers 2 and 22 are transparent. The second thermoplastic layer 6, which will provide edges of information carrying cards, may be translucent or opaque. In some embodiments, each of the first, second, and third thermoplastic layers 2, 6 and 22 may be in a same color or in different colors.

The layered structure 40 can be degassed and then pressed within a mold (not shown). The edges of the mold may include spacers (not shown) or the edges of the mold may function with spacers to control the thickness of the layered structure 40 after cured. The layered structure may be heated when it is pressed.

The crosslinkable polymer composition 16 is cured under a pressure and a temperature. For example, it is cured at a raised temperature of above 40° C. and less than 150° C. such as about 90-100° C.) under a pressure of less than 2 MPa. The crosslinkable polymer composition 16 becomes a crosslinked polymer composition 26, which is in a solid form, but may have flexibility. In some embodiments, the polymer composition is transparent before and after crosslinked.

When the layered structure 40 is degassed, pressed, and/or cured, in this unique design, the inlay layer 8 can move freely, thus self-center, inside the crosslinkable polymer composition 16, particularly inside a through-hole 7. The inlay layer 8 can move and center in a direction along the thickness of the second thermoplastic layer 6. In another word, the inlay layer 8 can move and center vertically and normal to a plane of the second thermoplastic layer 6. In addition, the inlay layer 8 can move and center with respect to the edges of each through-hole 7 defined by the second thermoplastic layer 6. In another word, the inlay layer 8 may move and center vertically along the direction of the plane of the second thermoplastic layer 6. The inlay layer 8 may not contact the second thermoplastic layer 6.

A suitable temperature for curing would be one that is sufficiently high to cure the cross-linkable polymer composition 16. Hot lamination of the thermoplastic layers may also occur for any areas without having crosslinkable polymer composition 16. After the heat treatment, the crosslinkable polymer composition 16 forms a solid. Such a cross-linked polymer composition 26 has good adhesion with each thermoplastic layer and inlay layer 8 including electronic component 10 and supporting film 12. In some embodiments, such a cross-linked composition is more flexible than any of the thermoplastic layers used. In some embodiments, curing methods such as visible light, UV or other radiation curing can be also used, separately or in combination with thermal curing. It may also comprise a step of curing via the introduction of moisture or the promotion of other chemical reactions.

In some embodiments, the crosslinked polymer composition 26 may have a hardness (Shore D) in a range from 10 to 85, for example, from 20 to 80, a tensile strength in a range of from 20 MPa to 100 MPa, for example, from 30 MPa to 60 MPa, an elongation in a range of from 1% to 20%, for example, from 2% to 10%, and a Young's modulus in a range of from 0.5 GPa to 8 GPa, for example, from 1 GPa to 5 GPa, following ASTM testing standards.

Figure 9:
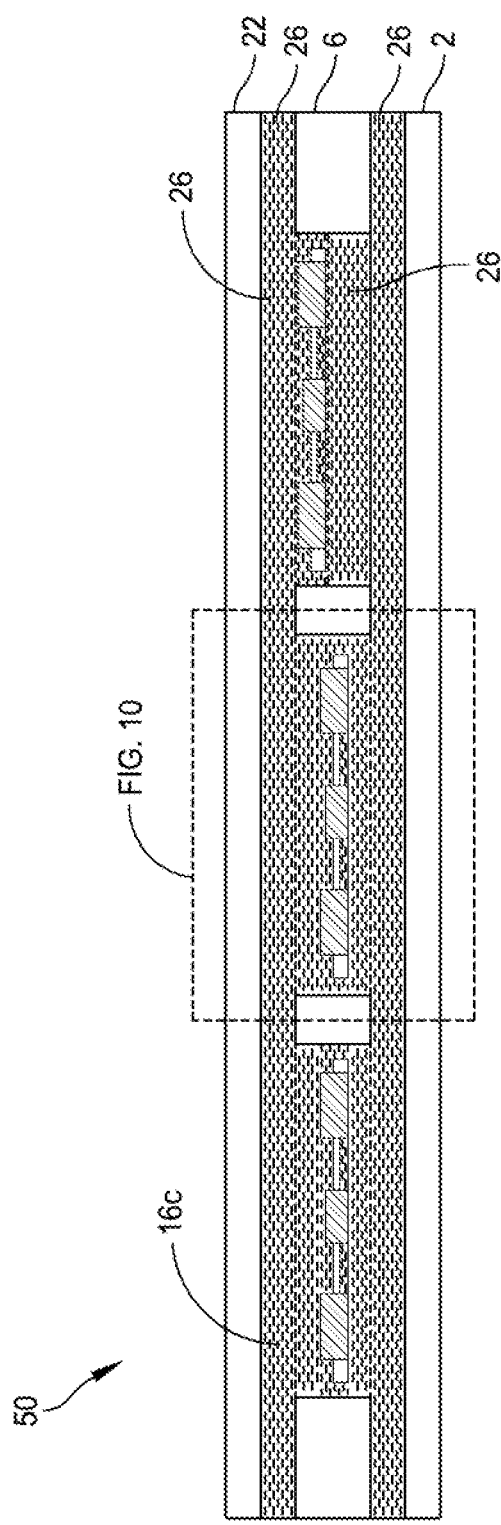
Figure 10:
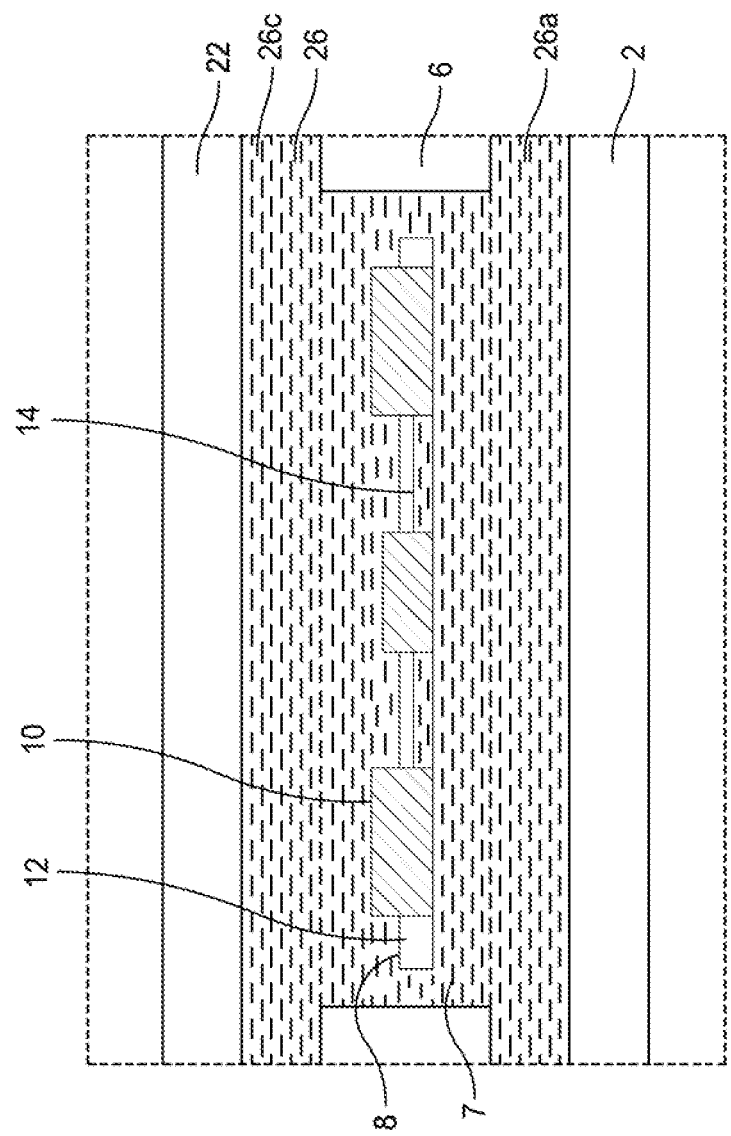

FIG. 9 illustrates the resulting core layer 50 after the crosslinkable polymer composition in the layers of FIG. 8 is cured (i.e., cross-linked) in accordance with some embodiments. FIG. 10 is a magnified view illustrating a portion of FIG. 9. The resulting core layer was used in fabricating a plurality of information carrying cards. FIGS. 9-10 illustrate a core layer 50 when a third thermoplastic layer 22 is used. When a release film 23 is applied to the third portion of the crosslinkable polymer composition 16, the release film 23 may be peeled off after the crosslinkable polymer composition 16 is cured. The resulting structure of the core layer will the same as that shown in FIGS. 9-10 except that it does not contain the third thermoplastic layer 22, and the crosslinked polymer composition 26 may provide the exterior surface opposite to the first thermoplastic layer 2.

Referring to FIGS. 9-10, such a core layer 50 is configured to be suitable for making a plurality of information carrying cards. The core layer 50 comprises a first thermoplastic layer 2, a second thermoplastic layer 6, a plurality of inlay layers 8, and a crosslinked polymer composition 26. The first thermoplastic layer 2 comprises a thermoplastic material. Each of the plurality of inlay layers 8 comprises at least one electronic component 10 for card functions. The second thermoplastic layer 6 is disposed over the first thermoplastic layer 2. The second thermoplastic layer 6 comprises a second thermoplastic material and defines a plurality of through-holes 7 therein.

The crosslinked polymer composition 26 includes a first portion 26a, a second portion 26b, and a third portion 26c, which are categorized roughly based on their locations for the convenience of description. The first portion 26a of the crosslinked polymer composition 26 is a layer disposed between the first thermoplastic layer 2 and the second thermoplastic layer 6. The second portion 26b of the crosslinked polymer composition 26 is disposed inside each of the plurality of through-holes 7. One respective inlay layer 8 is disposed inside the second portion 26b of the crosslinked polymer composition 26. The third portion 26c of the crosslinked polymer composition 26 is a layer disposed over each respective inlay layer 8 and on the second thermoplastic layer 6. The three portions of the crosslinked polymer composition 26 may roughly correspond to, but may not exactly originate from the three portions of the crosslinkable polymer composition 16 because the three portions are made of the same material, which can flow and move before cured. The three portions of the crosslinked polymer composition 26 may form a shape in a horizontally stretched "I" shape with an inlay layer 8 embedded in the middle, and they are attached with the second thermoplastic layer 6. The crosslinked polymer composition 26 with "I" shaped structure is a plug-in structure coupled with the thermoplastic layers providing a balance of the inlay layer inside the core layer. The third or the first thermoplastic layer may be optional in some embodiments. Sometimes both the first and the third thermoplastic layers are used. In some embodiments, the thermoplastic layers 2, 6, and 22 are separate from each other.

As described above, in the core layer 50, the respective inlay layer 8 is centered inside the second portion 36b of the crosslinked polymer composition and/or inside each of the plurality of through-holes 7, with respect to a thickness of the second thermoplastic layer and/or edges of a respective through-hole. In another word, the respective inlay layer 8 can be centered inside a through-hole vertically (normal to the plane of the second thermoplastic layer 6) or horizontally (along a direction parallel to the plane of the second thermoplastic layer 6).

In some embodiments, the core layer 50 further comprises a third thermoplastic layer 22 comprising a thermoplastic material or a release film 23 disposed on the third portion of the crosslinked polymer composition 26. The release film 23 can be peeled away, and resulting core layer 50 may not include the third thermoplastic layer 22 in some embodiments.

Each of the first, second, and third thermoplastic layers 2, 6, and 22 comprises a thermoplastic material selected from the group consisting of polyvinyl chloride, copolymer of vinyl chloride, polyolefin, polycarbonate, polyester, polyamide, and acrylonitrile butadiene styrene copolymer (ABS). Two or three of the first, second, and third thermoplastic layers 2, 6, and 22 comprise a same material type or a same material of the same composition. In some embodiments, the first and third thermoplastic layers 2 and 22 have a same thickness, which is less than that of the second thermoplastic layer. In some embodiments, the first and third thermoplastic layers 2 and 22 are transparent. The second thermoplastic layer 6 may be transparent too.

The at least one electronic component 10 may comprise one or more of one integrated circuit, one light emitting diode (LED), a battery, a switch, and a display screen.

The crosslinked polymer composition 26 comprises a base polymer selected from the group consisting of acrylate, methacrylate, urethane acrylate, silicone acrylate, epoxy acrylate, methacrylate, silicone, urethane and epoxy. The crosslinked polymer composition 26 is transparent in some embodiments.

FIG. 17 illustrates an exemplary method 200 of forming a core layer for a plurality of information carrying cards as described above. Method 200 may include the steps described below with the details described above.

At step 202, a first thermoplastic layer 2 and a plurality of inlay layers 8 as described above are provided.

At step 204, a first portion 16a of a crosslinkable polymer composition 16 is dispensed onto the first thermoplastic layer 2.

At step 206, a second thermoplastic layer 6 defining a plurality of through-holes 7 therein is applied over the first portion of the crosslinkable polymer composition 16 and the first thermoplastic layer 2.

At step 208, a second portion 16b of the crosslinkable polymer composition 16 is dispensed into each of the plurality of through-holes 7.

At step 210, one respective inlay layer 8 is placed over the second portion of the crosslinkable polymer composition 16 inside each of the plurality of through-holes 7.

At step 212, a third portion 16c of the crosslinkable polymer composition 16 is dispensed over each respective inlay layer 8, and may also dispensed over the second thermoplastic layer 6.

At step 214, a third thermoplastic layer 22 or a release film 23 may be applied over the third portion of the crosslinkable polymer composition 16 to provide a layered structure 40. Each respective inlay layer 8 is configured to be movable inside each respective through-hole 7 in the presence of the crosslinkable polymer composition 16 when the layered structure is pressed on a pressure. The respective inlay layer can self-center in the crosslinkable polymer composition 16, with respect to the thickness of the second thermoplastic layer and/or with respect to edges of a through-hole.

At step 216, the crosslinkable polymer composition is cured under a pressure and a curing condition such as an increased temperature. The layered structure 40 may be degassed to remove any trapped air before the curing step and then pressed in a mold with a spacer for matching or controlling the thickness during the curing step. In some embodiments, after each of steps 210 and 212, the structures are degassed by applying vacuum, and the degassing process may not be needed after step 216. After cured, the crosslinkable polymer composition 16 becomes a crosslinked polymer composition 26, which is in a solid form. In some embodiments, the polymer composition is transparent before and after crosslinked.

When a release film 23 is applied to the third portion of the crosslinkable polymer composition 16, the release film 23 is peeled off after the curing step.

Figure 18:
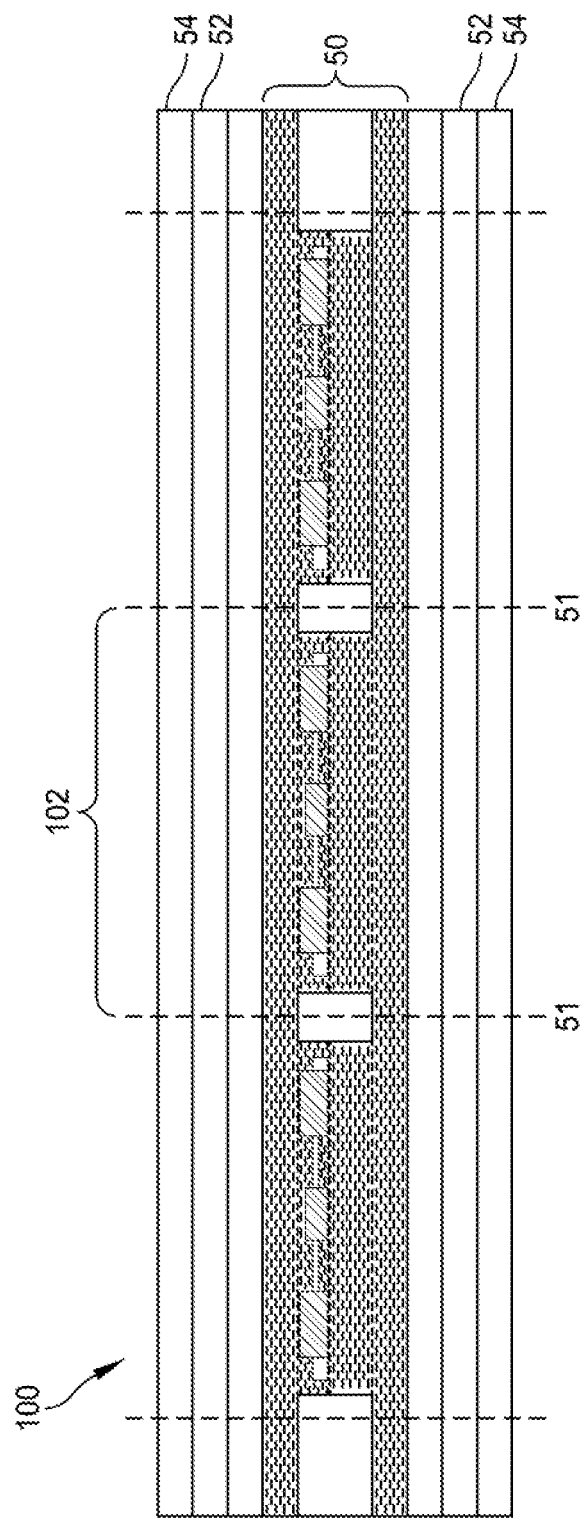
FIG. 18 is a cross section view illustrating an exemplary card product for a plurality of information carrying cards in accordance with some embodiments.
Figure 19:
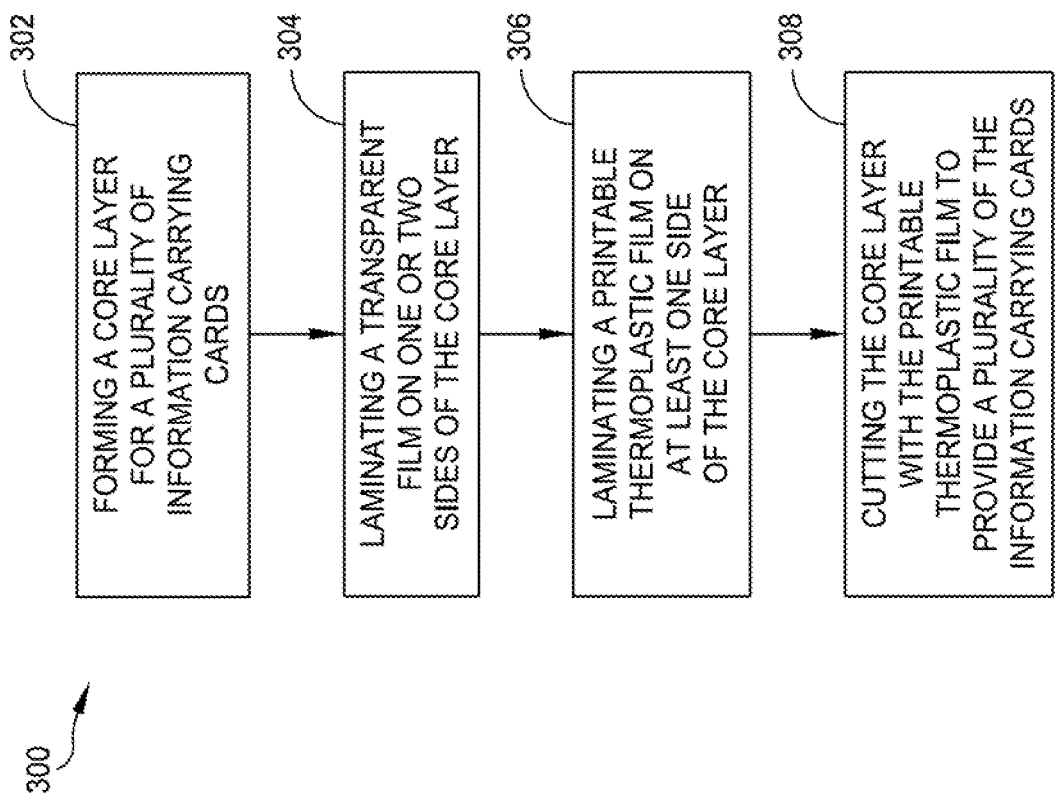
FIG. 19 is a flow chart illustrating an exemplary method for making the card product of FIG. 18 and a plurality of information carrying cards in accordance with some embodiments.

Referring to FIG. 18, an exemplary card product 100 for a plurality of information carrying cards in accordance with some embodiments. Referring to FIG. 19, an exemplary method 300 can be used to make the card product 100 of FIG. 18 and a plurality of information carrying cards 102 in accordance with some embodiments.

At step 302, a core layer 50 for a plurality of information carrying cards 102 can be made as described above according to the structure depicted FIGS. 1-16 and steps of FIG. 17. The core layer 50 comprises a first thermoplastic layer 2, a second thermoplastic layer 6, a plurality of inlay layers 8, and a crosslinked polymer composition 26 as described above. Inlay layer 8 comprises electronic components 10, for example, at least one printed circuit board (PCB), supporting film 12, and interconnects 14. The electronic components, such as a battery and an active or passive electronic components 10, are connected with interconnects 14. Electronic components 10 are embedded on supporting film 12.

In some embodiments, the core layer 50 is suitable for a plurality of information carrying cards 102, and may comprise a plurality of inlay layers 8 each having at least one active or passive electronic component, e.g., an integrated circuit (IC), a battery, a switch, a light emitting diode (LED), a device for generating one time passcode (OTP), and/or a display device.

In some embodiments, the cross-linked polymer composition 26 may directly contact one or more electronic components on the inlay layer. Each inlay layer is centered in a respective portion of the cross-linked polymer composition inside a respective through-hole in the core layer. Each inlay layer may not contact with any of the first, the second, and the third thermoplastic layers.

In some embodiments, the core layer 50 may include a third thermoplastic film 22 as described above and illustrated in FIGS. 9-10. In alternative embodiments, a release film 23 other than a third thermoplastic film 22 may be optionally used, and later peeled. In some embodiments, a thin paper or a release layer may be used to replace the first thermoplastic layer 2. In addition to the layers or films described above, additional release films or additional materials may be used.

The core layer may also include other additional layers or components based on different product design. For example, additional thermoplastic layers may be used. The core layer may also comprise a piece of metal, ceramic or plastic materials in the core layer of some information carrying cards. The piece of metal such as steel may be separate from the inlay layer 8 and is for decoration or weight only. The core layer having a piece of metal can be used to make "metal cards," which are a type of information carrying card weighing more than an information carrying card without such a piece of metal. In some embodiments, the piece of metal has a size large enough to provide edges for an information carrying card. After the process for making the information carrying card including final cutting steps, the edges of the metal piece are exposed and define the exterior edges of the resulting metal cards.

At step 304, a transparent thermoplastic film 52 may be laminated on each side of the core layer 50 through hot lamination. A transparent thermoplastic film 52 may be optional. When the core layer does not contain the third thermoplastic layer, a transparent thermoplastic film 52 may be used in some embodiments.

A transparent film 52 can be used as the outer layer of an information carrying card. Examples of transparent film 52 include but are not limited to PVC, modified PVC and PET.

At step 306, a printable thermoplastic film 54 is laminated on one or both sides of the core layer 50 through hot lamination.

A printable thermoplastic film layer 54 may be disposed onto on the core layer 50 directly, or on a transparent film 52, which may be laminated onto the core layer 50 first. The printable thermoplastic film 54 is an imaging receiving layer. Words or images can be printed onto the printable thermoplastic film 54 before or during a process of making an information card. In some embodiments, this film is not transparent, and contains some pigments such as white pigments.

The order of the transparent film 52 and the printable thermoplastic film 54 may be interchangeable. The structure illustrated in FIG. 18 is one example for illustration only.

A suitable temperature for hot lamination is sufficiently high so that all the films are laminated with good adhesion. In some embodiments, the temperature is in the range of 65-232° C. In some embodiments, the temperature is less than 150° C.

Additional overlay may be also added onto the front or back of the core layer 50. For example, a magnetic strip overlay may be added onto a back of the core layer 50.

At step 308, the core layer 50 with the printable thermoplastic film 54 and optionally a transparent thermoplastic film 52 can be cut to provide a plurality of the information carrying cards 102.

For illustration only, FIG. 18 only shows three through-holes 7 and three information carrying card units in the exemplary card product 100, which may be cut into three identical information carrying cards 102. The card product 100 may be cut along the dashed lines 51. The edges in the card product 100 may be enlarged in the drawing for illustration. The card product 100 may be cut along two dashed lines 51 in the middle to make three information carrying cards 102.

The information carrying cards may have different shapes and sizes. In some embodiments, the information card may have a size following ISO/IEC 7810 standard. For example, an ID-1 type smart card, which is for most of the banking card and ID cards, has a size of 85.6×53.98 mm. The information carrying cards may be also milled or any finishing process to cingulate the cards. The information carrying cards may be used as or used for finished cards, badges, bracelets, tags, and any other smart cards of a suitable form.

Rectangular shaped information carrying cards or smart cards in this disclosure are for illustration only. The disclosure structure and process of making also apply to any information carrying card or part of any shapes and any size. Examples of these parts include but are not limited to rectangular sheets, circular sheets, strips, rods and rings. The size includes but is not limited to any size following ISO/IEC 7810 standard.

Referring to FIG. 18 and FIGS. 9-10, an exemplary information carrying card 102 is provided in the present disclosure. Information carrying card 102 comprises a first thermoplastic layer 2, an inlay layer 8, a second thermoplastic layer 6, and a crosslinked polymer composition 26 as described above. The second thermoplastic layer 6 is disposed over the first thermoplastic layer 2. The second thermoplastic layer 6 defines a through-hole 7 therein.

The crosslinked polymer composition 26 includes a first portion, a second portion, and a third portion. The first portion of the crosslinked polymer composition is a layer disposed between the first thermoplastic layer 2 and the second thermoplastic layer 6. The second portion of the crosslinked polymer composition 26 is disposed inside the through-hole 7. The inlay layer 8 is disposed inside the second portion of the crosslinked polymer composition 26. The third portion of the crosslinked polymer composition 26 is a layer disposed over the inlay layer 8 and on the second thermoplastic layer 6. The inlay layer is centered inside the through-hole with respect to a thickness of the second thermoplastic layer 6 and/or edges of a respective through-hole 7.

In some embodiments, the information carrying card 102 further comprises a third thermoplastic layer 22 disposed on the third portion of the crosslinked polymer composition 26.

The information carrying card may further comprise at least one printable thermoplastic film 52 and optional a transparent thermoplastic film 54 bonded onto the first thermoplastic layer 22, or the third thermoplastic layer 2, or the third portion of the crosslinked polymer composition 26.

In some embodiments, each of the first, second, and third thermoplastic layers 2, 6, and 22 comprises a thermoplastic material selected from the group consisting of polyvinyl chloride, copolymer of vinyl chloride, polyolefin, polycarbonate, polyester, polyamide, and acrylonitrile butadiene styrene copolymer (ABS). Two or three of the first, second, and third thermoplastic layers 2, 6, and 22 comprise a same material type or a same material having a same composition.

Each layer may have a suitable thickness as described above. In some embodiments, the first and third thermoplastic layers 2 and 22 have a same thickness, which is less than that of the second thermoplastic layer, and are transparent. The at least one electronic component comprises one or more of one integrated circuit, one light emitting diode (LED), a battery, a switch, and a display screen. The crosslinked polymer composition 26 may comprise a base polymer selected from the group consisting of acrylate, methacrylate, urethane acrylate, silicone acrylate, epoxy acrylate, methacrylate, silicone, urethane and epoxy. The crosslinked polymer composition may be transparent.

Figure 20:
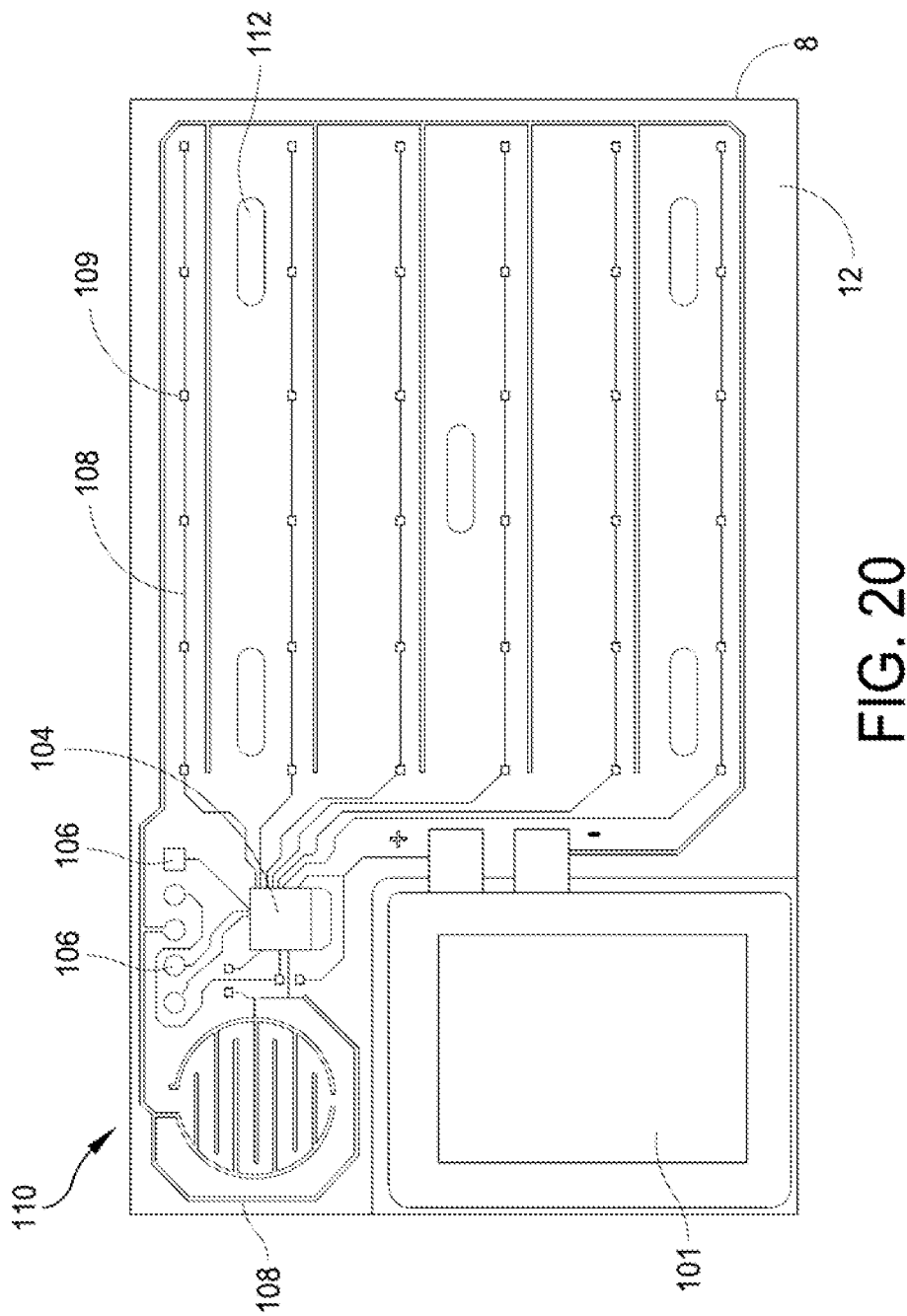
FIG. 20 is a plan view of an exemplary inlay layer in accordance with some embodiments.

Referring to FIG. 20, an exemplary inlay layer 8 (as denoted as 110) is used as a model for demonstration purpose. The electronic components used for a core layer of an information carrying card are not limited to the components illustrated in FIG. 20. Inlay layer 8 comprises a supporting film 12, a battery 101, a chip 104 having at least one integrated circuit (IC), metal structures 106, metal interconnect wires 108, and functional components such as LED 109. Supporting film 12 is a polymer based dielectric material in some embodiments. This inlay layer is suitable for a "power card." The exemplary layer may optionally define a plurality of holes on the portion of the supporting film 12 without any electronic components and interconnect wires. The holes can be of any suitable shape and any suitable size. Examples of the shape of the holes include but are not limited to circle, rectangle, square or any other shape.

Figure 21:
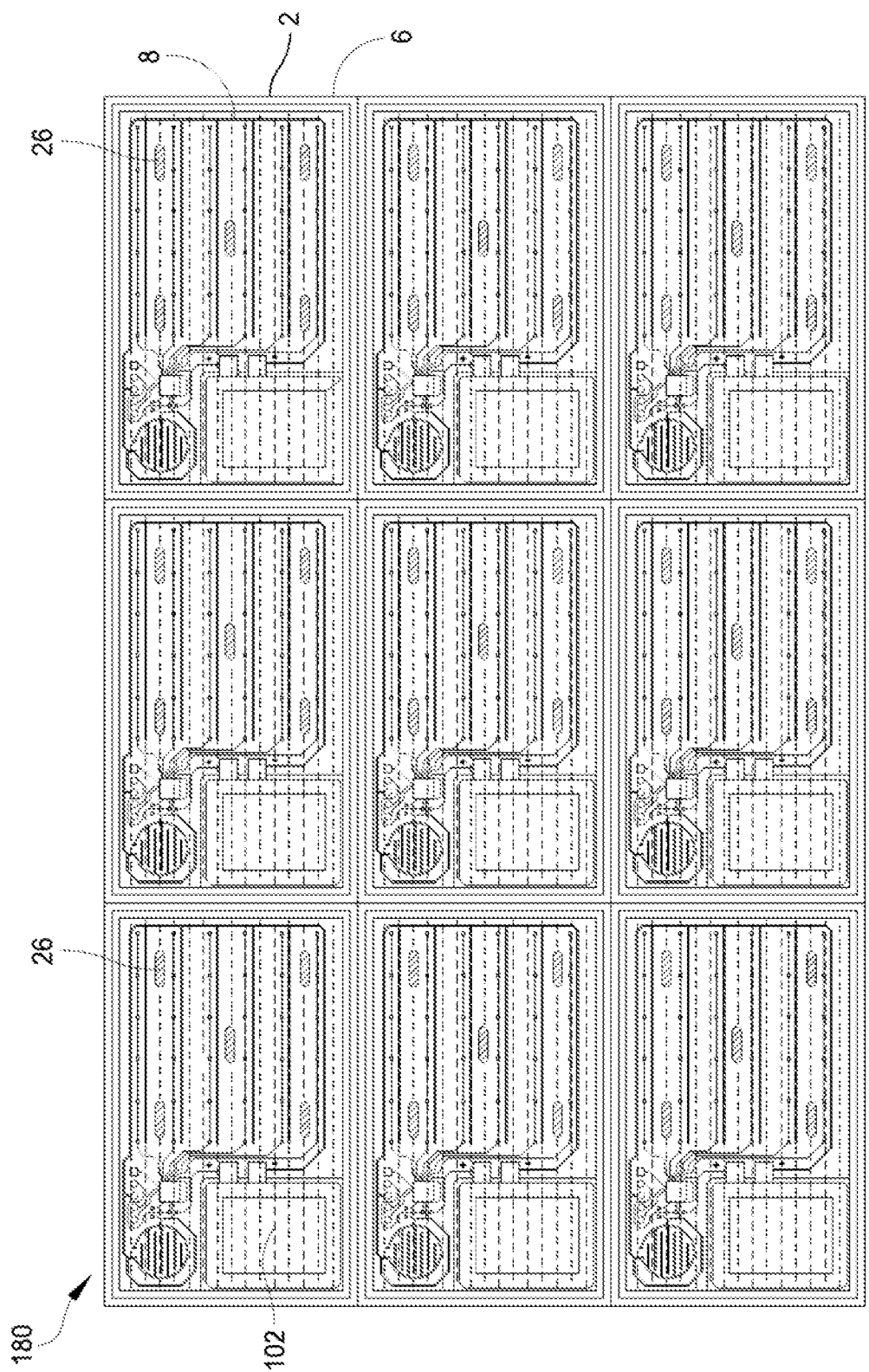
FIG. 21 is a schematic drawing illustrating an exemplary core layer structure for a plurality of information carrying cards during an exemplary manufacturing process, in accordance with some embodiments.

Referring to FIG. 21, an exemplary core layer structure 180 comprising a plurality of inlay layers 8 can be fabricated using process 200 as described above, and can be used for making a plurality of information carrying cards. In some embodiments, each inlay layer 8 is disposed a portion of the cross-linked polymer composition 26 inside a through-hole. Inlay layer 8 comprises electronic components 10, for example, at least one printed circuit board (PCB), supporting film 12, and interconnects 14. The number of the inlay layers in FIG. 21 is for illustration only, and can be any suitable number.

Figure 22:
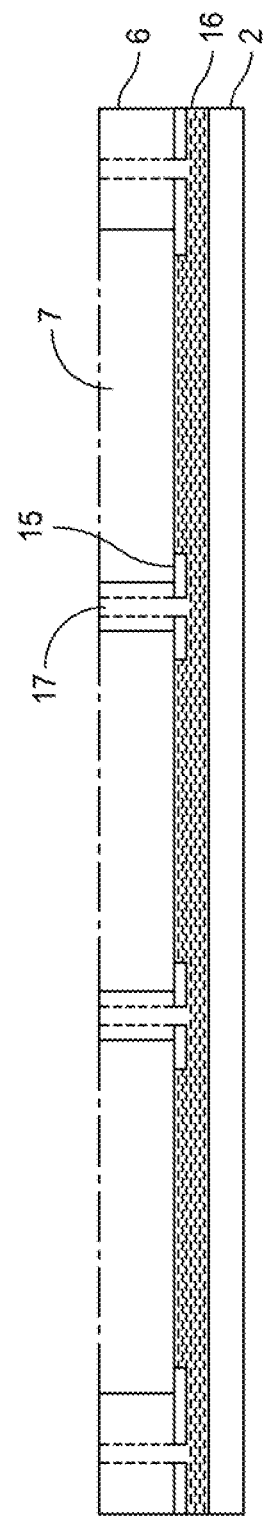
FIG. 22 is a cross section view illustrating a second thermoplastic layer having a plurality of through-holes disposed over the crosslinkable polymer composition and the first thermoplastic layer as shown in FIG. 3 except that a plurality of tabs are disposed below the second thermoplastic layer around the plurality of through-holes in accordance with some embodiments.
Figure 23:
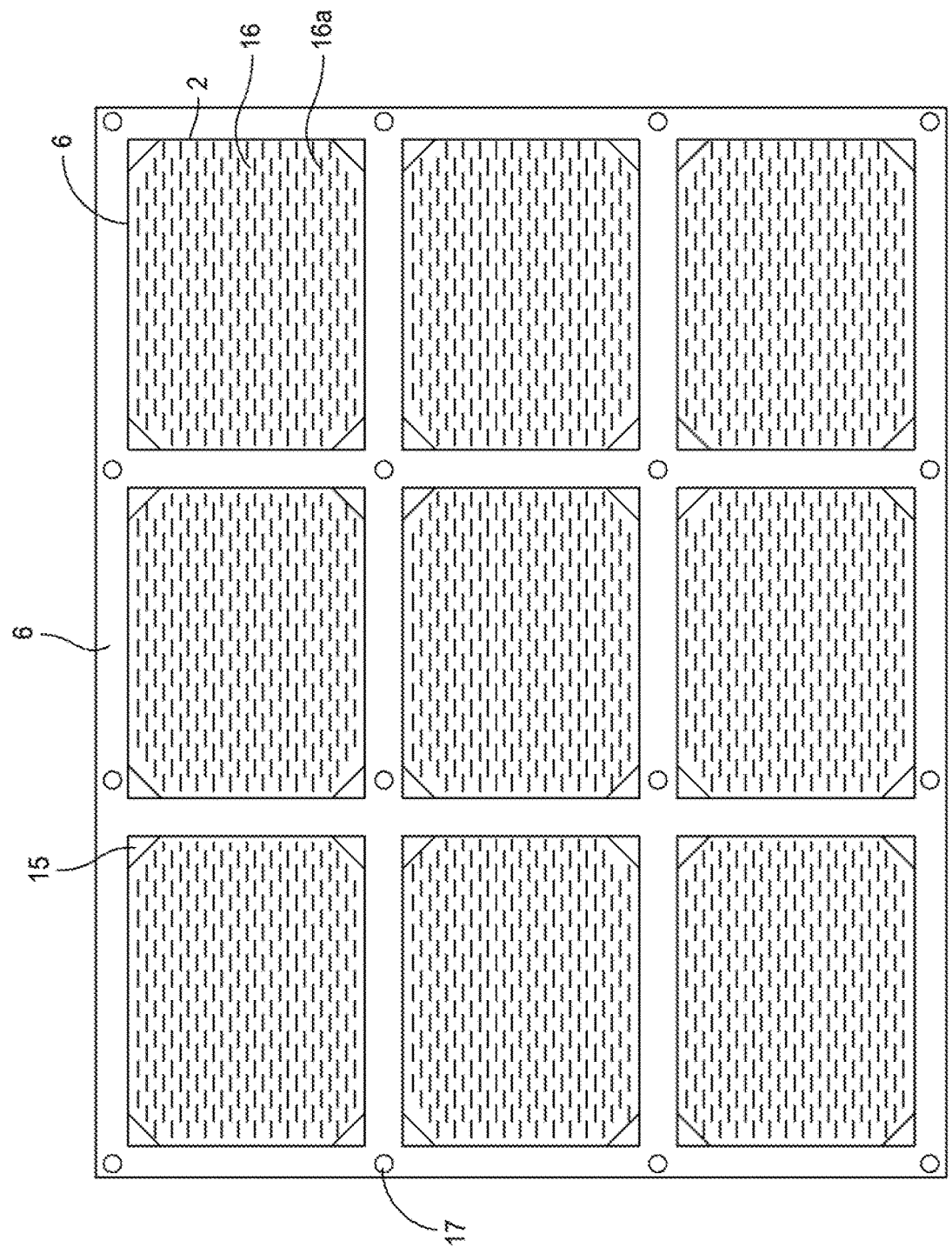
FIG. 23 is a plan view illustrating the structure as shown in FIG. 22, which is similar to that of FIG. 13 except that a plurality of tabs are disposed below the second thermoplastic layer around the plurality of through-holes in accordance with some embodiments.

In accordance with some embodiments, a plurality of tabs are used in the methods and the products described in FIGS. 1-21. FIGS. 22 and 23 correspond to FIG. 3 and FIG. 13, respectively, except that a plurality of tabs 15 are shown in FIGS. 22-23. All other descriptions in FIGS. 1-21 are applicable to the embodiments with a plurality of tabs. For brevity, descriptions of the methods and the structures except the tabs as described herein provided above with reference to FIGS. 1-21, are not repeated. The designs having tabs are called tabbed designs.

Referring to FIGS. 22 and 23, a plurality of tabs 15 are disposed around the plurality of through-holes 7 in the second thermoplastic layer 6 and below the second thermoplastic layer 6. The second thermoplastic layer 6 having a plurality of through-holes 7 and the plurality of tabs 15 are disposed over the first portion of the crosslinkable polymer composition 16 and the first thermoplastic layer 2 as shown in FIG. 22. The tabs 15 can be also considered as a part of the second thermoplastic layer 6. As illustrated in FIG. 23, in some embodiments, a piece of thin film having a suitable shape such as a square is placed under a frame intersection of the second thermoplastic layer 6 to provide a tab having a suitable shape such as a triangle shape diagonally in each corner of a through-hole 7. The tabs may comprise any suitable materials such as plastics or metal. In some embodiments, the tab may be a thin film of 0.0254 mm or less thick and made of a transparent thermoplastic polymer such as PVC. The tabs 15 and the second thermoplastic layer 6 can be bonded or separate from each other. Around each through-hole 7, there may be any suitable number of tabs 15, for example, two, three, or four tabs 15. The four tabs 15 in one through-hole 7 in FIG. 23 are for illustration only. The inlay lay 8 may not contact the tabs 15.

As shown in FIGS. 22-23, the tabs 15 and the corresponding locations of the second thermoplastic layer 6 may define holes 17 going through both layers and are configured to let the crosslinkable polymer composition flow through the holes 17. The holes 17 are optional. This design provides stability of an inlay layer 8 particularly for a thin inlay layer having a thickness of 0.127 mm, and is useful to prevent a very thin inlay layer from getting below the second thermoplastic layer. The through-holes 7 and/or the holes 17 in the tabs 15 can be used for machine registration to put the layers of materials together.

The tabs 15 stay in the product structures after the crosslinkable polymer composition is cured. So the resulting core layer as shown in FIGS. 9-10 and the information carrying cards in FIGS. 18 and 21 further comprise the tabs 15 as described herein. In some embodiments, the core layer 50 as described above further comprises a plurality of tabs 15 disposed around the plurality of through-holes 7 in the second thermoplastic layer 6, below the second thermoplastic layer 6, and inside the first portion of the crosslinked polymer composition 26. The information carrying card 102 as described above further comprises one or more tabs 15 disposed around the through-hole 7 in the second thermoplastic layer 6, below the second thermoplastic layer 2, and inside the first portion of the crosslinkable polymer composition 26.

Figure 24:
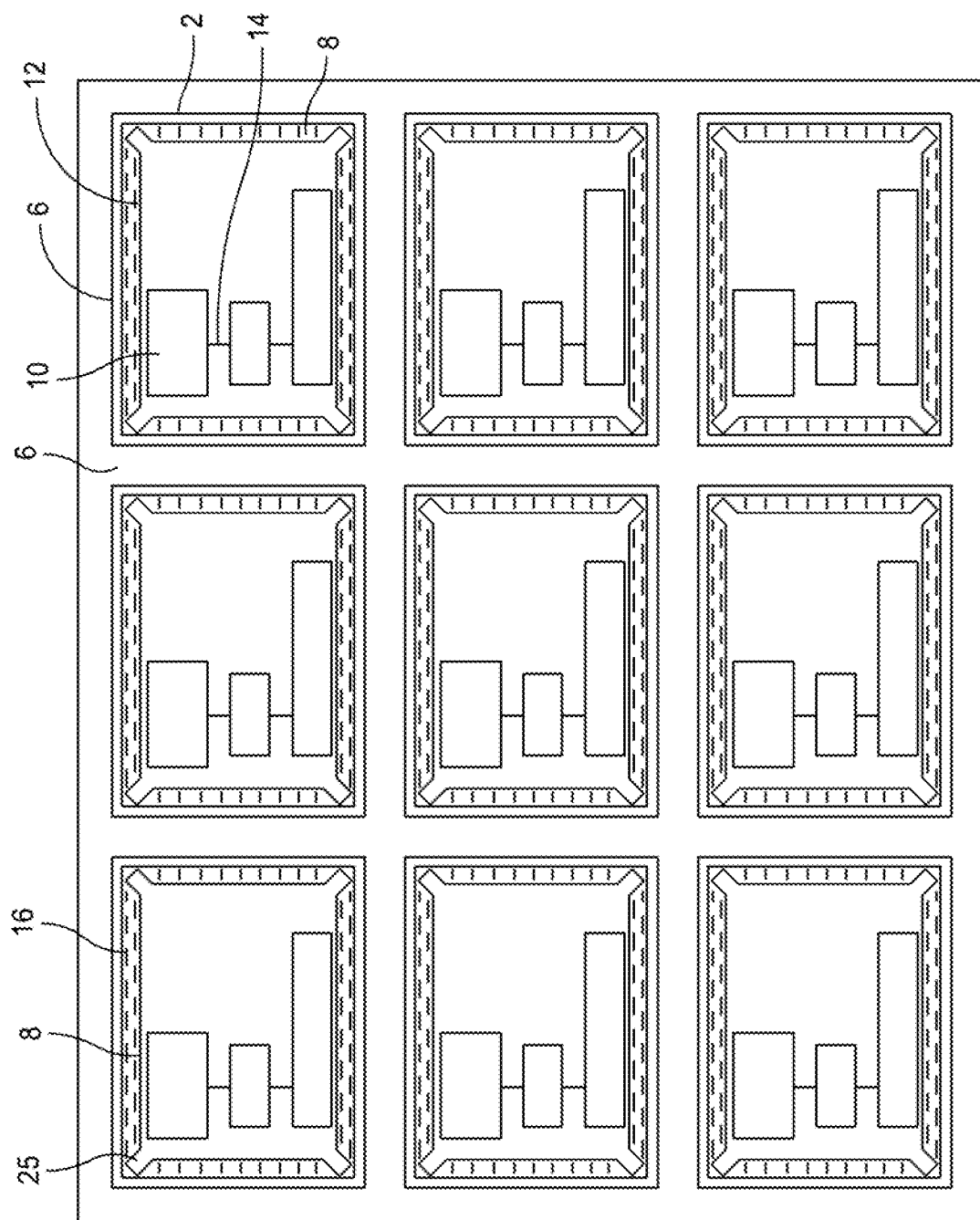
FIG. 24 is a plan view illustrating the layers after an inlay layer having built-in tabs is disposed inside the through-holes of the second thermoplastic layer. The structure illustrated in FIG. 0.24 is similar to that of FIG. 15 except that the inlay layer having built-in tabs.

Referring to FIG. 24, in some embodiments, other than a plurality of tabs 15 separately used, an inlay layer 8 may comprises a protruding or convex structure functioning as a built-in tab 25 in each corner of the inlay layer 8. The built-in tabs 25 and the inlay layer 8 may not contact the edges of the through-hole 7. The second thermoplastic layer 6 may also optionally define holes 17 in the frame intersections as shown in FIGS. 22-23. The resulting core layer and the information carrying cards also further comprise the built-in tabs 25 in the inlay layer 8 as described herein. In some embodiments, in the core layer 50 as described above, each respective inlay layer 8 comprises a built-in tab 25 in each corner. In the information carrying card 102 as described above, each respective inlay layer 8 comprises a built-in tab 25 in each corner.

The core layer comprising a crosslinkable polymer composition can be made through a lamination process, for example, a hot lamination process, and is suitable for making a plurality of information carrying cards simultaneously. The processes for making the core layer and making the cards can be separately performed in two different locations at different time. The core layer and the resulting information carrying card have unique structures and performance in addition to processing advantages. The core layer and the information carrying card are in a flat plane, and inlay layers can self-center and self-level inside the crosslinkable and crosslinked composition. The method for making a core layer as described is suitable for any inlay layer of varied geometries and sizes. The core layer has two smooth uniform coplanar surfaces. The core layer and resulting card products carry no or very little residue stress, and have no warpage. The core layer and the information carrying card have good flexibility and durability. In addition to mild processing condition, the core layers and the information carrying card offers good protection to sensitive electronic components.

The exemplary processes 200 and 300 can be used to make a plurality of information carrying cards on one sheet in accordance with some embodiments.

Examples

Experimental Examples of a core layer 50 were made according to the method and the structures described in FIGS. 1-17. A first thermoplastic layer 2 used was a transparent PVC film having a thickness of 0.0254 mm (1 mil).

A second thermoplastic layer 6 used was a PVC sheet having a thickness of 0.33 mm (13 mil). A third thermoplastic layer 22 was used. The third thermoplastic layer 22 used was a transparent PVC film having a thickness of 0.0254 mm (1 mil). The second thermoplastic layer 6 has a size of about 50 cm×70 cm and is configured to include 40 through-holes arranged regularly in a 4×10 array. Each through-hole has a size of about 7.6 cm×5 cm. Each through-hole and its surrounding frame from the second thermoplastic layer 6 had an area of about 12.5 cm×7 cm, which would provide enough area for an information carrying card of a suitable size, for example, a size of 85.6×53.98 mm. One resulting core layer had capability for making 40 information carrying cards. The thermoplastic layers used are not bonded or fixed. The second thermoplastic layer 6 used was also made of PVC, and was transparent, translucent, or opaque depending on the designs.

A clear and thermal-curable epoxy was used as the crosslinkable polymer composition 16, which was weighed and dispensed by a robot controlled dispenser. The epoxy composition is two-part unfilled low viscosity epoxy formulation: part A includes epoxy resin while part B includes polyglycol diamine and poly(oxypropylene) diamine as curatives. Part A and part B have viscosity of about 7,000 center poises (cP) and 3,000 cP, respectively. Part A and part B can be mixed at a ratio of about 2:1 by volume and about 2.23 to 1 by weight. The mixed formulation has viscosity of about 4,000 cP. The viscosity data were measured using TA Instrument Rheometer with 25 mm parallel plate at 1/s and 25° C. The mixed formulation could be cured at 65° C. for 30 minutes. The cured epoxy composition showed a glass transition temperature of about 64° C. measured by using differential scanning calorimetry and a hardness (Shore D) of 80 tested following testing standard ASTM D2240. The cured epoxy composition showed a tensile strength of about 54.5 MPa, an elongation of about 6%, and a modulus of 2.48 GPa tested following testing standard ASTM D638.

The first portion of the crosslinkable polymer composition 16 used weighed 18 grams in total. The second portion of the crosslinkable polymer composition 16 applied to the through-holes also weighed about 18 grams in total. After the inlay layers 8 were placed into all the through-holes, a specific amount of the third portion of the crosslinkable polymer composition 16 was added to cover the opening of every through-hole and then the second thermoplastic layer 6. Each of the first portion and the third portion of the crosslinkable polymer composition 16 provided a layer of about 0.0254 mm between the first and the second thermoplastic layers, and between the second and the third thermoplastic layers, respectively.

After the third thermoplastic layer 22 was applied, the resulting layered structure of about 0.432 mm (17 mil) was degassed and then cured under a pressure and a temperature, for example, 102° C. The pressure was provided in a steel mold having a top piece, a bottom piece, and a shim therebetween as a spacer, which has a thickness of about 0.432 mm (17 mil). The crosslinked polymer composition was transparent. The inlay layer also included a transparent supporting film. Therefore, the electronic components on the inlay layers can be easily seen in the resulting core layers.

Comparative Samples were made using Applicant's existing technology on a method for forming a core layer of an information carrying card as described, for example, in U.S. Pat. No. 9,594,999. The resulting core layer and information carrying card are described, for example, in U.S. Pat. No. 9,439,334. In such a method, a thermoplastic layer made of PVC (0.33 mm thick) is cut with hole and then laminated with another thermoplastic film made of PVC (0.0254 mm thick). The two layers together defined a plurality of cavity therein. Each cavity had a size identical to that of the through-hole as described above. The same inlay layer comprising printed circuit board (PCB) is disposed into the at least one cavity. The same crosslinkable polymer composition is dispensed over and directly contacting the inlay layer in the at least one cavity so as to form the core layer for an information carrying card using the same processing including curing condition. The crosslinkable polymer composition is cured to form a crosslinked polymer composition.

In both Experimental Examples and Comparative Examples, the same materials including the same thermoplastic layers, the same crosslinkable polymer composition, and the same inlay layer were used. The same dimensions for the core layers were used. Twenty samples of Experimental Examples and twenty samples of Comparative Examples were made.

The resulting samples were evaluated in three categories including product quality, thickness variation across a core layer, and warpage of a core layer. The flatness of the core layer refers to the dimensional quality of the core layer without any warpage. The product quality was evaluated by visual inspection to check whether the core layer included any defects such as air bubbles. The thickness variation was measured using a micrometer to indicate whether a core layer has two coplanar flat surfaces. Warpage of a core layer for a plurality of information cards was evaluated based on the highest displacement normal to a base line connecting two corners of a core layer as commonly measured. Existences of warpage may be caused by residue stress and non-uniformity of a core layer. Warpage of a core layer would cause difficulty in making information carrying cards and their performance.

The data are summarized in Table 1. No tabs were used in the samples in Table 1. As shown in Table 1, among 20 Experimental Samples, only one sample showed a bubble. As a comparison, among 20 Comparative Samples, nine samples showed defects, including three samples having one defect such as bubble or spot, four samples with two defects, one sample having three defects, and one sample having four or more defects.

Among 20 Experimental Samples, 18 samples had a thickness variation less than 0.0254 mm and two samples had a thickness variation between 0.0254 mm and 0.0508 mm (1-2 mil. As a comparison, among 20 Comparative Samples, 10 samples had a thickness variation less than 0.0254 mm, eight samples had a thickness variation between 0.0254 mm and 0.0508 mm (1-2 mil), and two samples had a thickness variation greater than 0.0508 mm.

As also shown in Table 1, the 20. Experimental Samples had much better surface flatness and much less warpage than the 20. Comparative Samples. The samples made using the methods provided in the present disclosure show no convex or concave warpage. All the 20 experimental core layer samples had an overall flatness within the specifications, for example, with warpage less than 8 mm. Among 20 Comparative Samples, only two samples had warpage less than 8 mm. In another word, only two samples had flatness within the specification.

TABLE 1

|  | Experimental Examples | Comparative Examples |
|---|---|---|
| Number of Samples | 20 | 20 |
| Number of Samples with Defects | 1 | 9 |
| Percentage of Samples with no defects | 95% | 55% |
| Number of Samples with Thickness Variation | | |
| less than 0.0254 mm (1 mil) | 18 | 10 |
| 0.0254-0.0508 mm (1-2 mil) | 2 | 8 |
| larger than 0.0508 mm (2 mil) | | 2 |
| Samples with flatness within the specification at Temperature of >=32° C. Warpage | 20 | 2 |
| 2-4 mm | 14 | 0 |
| 4-6 mm | 4 | 0 |
| 6-8 mm | 2 | 2 |
| 8-10 mm | | 4 |
| higher than 10 mm | | 14 |

Although the subject matter has been described in terms of exemplary embodiments, it is not limited thereto. Rather, the appended claims should be construed broadly, to include other variants and embodiments, which may be made by those skilled in the art.

What is claimed is:

1. A method for forming a core layer for a plurality of information carrying cards, comprising:
   providing a first thermoplastic layer and a plurality of inlay layers, wherein the first thermoplastic layer comprises a thermoplastic material and each of the plurality of inlay layers comprises at least one electronic component;
   dispensing a first portion of a crosslinkable polymer composition onto the first thermoplastic layer;
   applying a second thermoplastic layer over the first portion of the crosslinkable polymer composition and the first thermoplastic layer, wherein the second thermoplastic layer comprises a second thermoplastic material and defines a plurality of through-holes therein;
   dispensing a second portion of the crosslinkable polymer composition to each of the plurality of through-holes;
   putting one respective inlay layer over the second portion of the crosslinkable polymer composition inside each of the plurality of through-holes;
   dispensing a third portion of the crosslinkable polymer composition over each respective inlay layer; and
   applying a third thermoplastic layer or a release film over the third portion of the crosslinkable polymer composition to provide a layered structure, wherein the third thermoplastic layer comprises a third thermoplastic material,
   wherein each respective inlay layer is configured to be movable inside each of the plurality of through-holes in the presence of the crosslinkable polymer composition when the layered structure is pressed on a pressure; and
   disposing a plurality of tabs around the plurality of through-holes in the second thermoplastic layer, wherein the plurality of tabs are disposed below the second thermoplastic layer and over the first portion of the crosslinkable polymer composition.

2. The method of claim 1, wherein each of the first, second, and third thermoplastic layers comprises a thermoplastic material selected from the group consisting of polyvinyl chloride, copolymer of vinyl chloride, polyolefin, polycarbonate, polyester, polyamide, and acrylonitrile butadiene styrene copolymer (ABS).

3. The method of claim 1, wherein two or three of the first, second, and third thermoplastic layers comprise a same material.

4. The method of claim 1, wherein the first and third thermoplastic layers have a thickness less than that of the second thermoplastic layer.

5. The method of claim 1, wherein the first and third thermoplastic layers are transparent.

6. The method of claim 1, wherein the at least one electronic component comprises at least one integrated circuit.

7. The method of claim 1, wherein the at least one electronic component comprises at least one light emitting diode (LED), a battery, a switch, or a display screen.

8. The method of claim 1, wherein the respective inlay layer is configured to move freely so as to be self-centered in the crosslinked polymer composition.

9. The method of claim 1, wherein the crosslinkable polymer composition comprises:
   a curable precursor, the curable precursor selected from the group consisting of acrylate, methacrylate, urethane acrylate, silicone acrylate, epoxy acrylate, methacrylate, silicone, urethane and epoxy, and
   the crosslinkable polymer composition is a liquid or a paste.

10. The method of claim 1, further comprising: curing the crosslinkable polymer composition under a pressure and a temperature, wherein the crosslinkable polymer composition becomes a crosslinked polymer composition.

11. The method of claim 10, wherein the crosslinked polymer composition is transparent.

12. The method of claim 10, further comprising peeling off the release film when the release film is applied to the third portion of the crosslinkable polymer composition.

13. A method for forming a core layer for a plurality of information carrying cards, comprising:
   providing a first thermoplastic layer and a plurality of inlay layers, wherein the first thermoplastic layer comprises a thermoplastic material and each of the plurality of inlay layers comprises at least one electronic component;
   dispensing a first portion of a crosslinkable polymer composition onto the first thermoplastic layer;
   applying a second thermoplastic layer over the first portion of the crosslinkable polymer composition and the first thermoplastic layer, wherein the second thermoplastic layer comprises a second thermoplastic material and defines a plurality of through-holes therein;
   dispensing a second portion of the crosslinkable polymer composition to each of the plurality of through-holes;
   putting one respective inlay layer over the second portion of the crosslinkable polymer composition inside each of the plurality of through-holes;
   dispensing a third portion of the crosslinkable polymer composition over each respective inlay layer; and
   applying a third thermoplastic layer or a release film over the third portion of the crosslinkable polymer composition to provide a layered structure, wherein the third thermoplastic layer comprises a third thermoplastic material, wherein each respective inlay layer is configured to be movable inside each of the plurality of through-holes in the presence of the crosslinkable polymer composition when the layered structure is pressed on a pressure; and further wherein each respective inlay layer comprises a built-in tab in each corner.

14. A method for fabricating a plurality of information carrying cards, comprising forming a core layer according to claim 1.

15. The method of claim 14, further comprising laminating a printable thermoplastic film on one side of the core layer.

16. The method of claim 15, further comprising laminating a transparent thermoplastic film onto the printed thermoplastic film.

17. The method of claim 15, further comprising cutting the core layer with the printable thermoplastic film to provide a plurality of the information carrying cards.

18. The method of claim 14, wherein the core layer comprises a plurality of tabs disposed around the plurality of through-holes in the second thermoplastic layer, below the second thermoplastic layer and over the first portion of the crosslinkable polymer composition.

19. The method of claim 14, wherein each respective inlay layer comprises a built-in tab in each corner.

* * * * *